United States Patent
Jeong et al.

(10) Patent No.: US 10,927,218 B2
(45) Date of Patent: Feb. 23, 2021

(54) POLY(AMIDE-IMIDE) COPOLYMER, COMPOSITION FOR PREPARING POLY(AMIDE-IMIDE) COPOLYMER, ARTICLE INCLUDING POLY(AMIDE-IMIDE) COPOLYMER, AND DISPLAY DEVICE INCLUDING THE ARTICLE

(71) Applicants: SAMSUNG ELECTRONICS CO., LTD., Suwon-si (KR); SAMSUNG SDI CO., LTD., Yongin-si (KR)

(72) Inventors: Boreum Jeong, Daejeon (KR); Sang Soo Jee, Hwaseong-si (KR); Won Suk Chang, Hwaseong-si (KR); Kyeong-sik Ju, Suwon-si (KR); Chanjae Ahn, Suwon-si (KR); A Ra Jo, Euiwang-si (KR); Sungwon Choi, Hwaseong-si (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 131 days.

(21) Appl. No.: 16/126,270

(22) Filed: Sep. 10, 2018

(65) Prior Publication Data
US 2019/0077917 A1    Mar. 14, 2019

(30) Foreign Application Priority Data

Sep. 8, 2017  (KR) .................. 10-2017-0115219
Sep. 7, 2018  (KR) .................. 10-2018-0106898

(51) Int. Cl.
C08G 73/14       (2006.01)
G02B 1/14        (2015.01)
(Continued)

(52) U.S. Cl.
CPC ......... *C08G 73/14* (2013.01); *C08G 73/1039* (2013.01); *C08G 73/1042* (2013.01);
(Continued)

(58) Field of Classification Search
CPC ..................................................... C08G 73/14
(Continued)

(56) References Cited

U.S. PATENT DOCUMENTS

| 4,186,263 A | 1/1980 | Morello |
| 5,397,684 A | 3/1995 | Hogan et al. |

(Continued)

FOREIGN PATENT DOCUMENTS

| CN | 104810522 A | 7/2015 |
| CN | 105734710 A | 7/2016 |

(Continued)

OTHER PUBLICATIONS

U.S. Appl. No. 16/126,250 Claims (Year: 2018).*
(Continued)

*Primary Examiner* — Duc Truong
(74) *Attorney, Agent, or Firm* — Cantor Colburn LLP

(57) ABSTRACT

A poly(amide-imide) copolymer that is a reaction product of a substituted or unsubstituted aromatic diamine having a maximum absorption wavelength in a range from 500 nanometers (nm) to 650 nm in a visible light region, a diamine represented by Chemical Formula 1, a dicarbonyl compound represented by Chemical Formula 2, and a tetracarboxylic acid dianhydride represented by Chemical Formula 3:

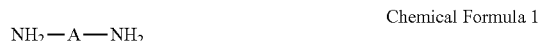

Chemical Formula 1

Chemical Formula 2

(Continued)

-continued

Chemical Formula 3

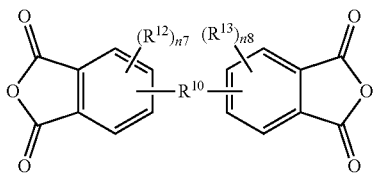

wherein, in Chemical Formulae 1 to 3, A, $R^3$, $R^{10}$, $R^{12}$, $R^{13}$, X, n7 and n8 are the same as defined in the specification.

21 Claims, 2 Drawing Sheets

(51) Int. Cl.
*C08J 5/18* (2006.01)
*C08G 73/10* (2006.01)
(52) U.S. Cl.
CPC ............ *C08G 73/1067* (2013.01); *C08J 5/18* (2013.01); *G02B 1/14* (2015.01); *C08J 2379/08* (2013.01)
(58) Field of Classification Search
USPC ....................................................... 528/220
See application file for complete search history.

(56) References Cited

U.S. PATENT DOCUMENTS

| | | | |
|---|---|---|---|
| 5,441,797 | A | 8/1995 | Hogan et al. |
| 5,536,792 | A | 7/1996 | Hogan et al. |
| 5,539,080 | A | 7/1996 | Hogan et al. |
| 8,785,589 | B1 | 7/2014 | Tan et al. |
| 8,956,732 | B2 | 2/2015 | Takeuchi et al. |
| 10,619,045 | B2 * | 4/2020 | Ahn et al. ............... C08G 73/14 |
| 2016/0053138 | A1 | 2/2016 | Lee et al. |
| 2016/0238764 | A1 | 8/2016 | Liu et al. |
| 2016/0319076 | A1 * | 11/2016 | Ju et al. ................. C08G 73/14 |
| 2017/0121460 | A1 | 5/2017 | Hong et al. |
| 2017/0190880 | A1 | 7/2017 | Jo et al. |

FOREIGN PATENT DOCUMENTS

| | | |
|---|---|---|
| CN | 106283659 A | 1/2017 |
| JP | 4908698 B2 | 1/2012 |
| JP | 5287247 B2 | 6/2013 |
| JP | 5522426 B2 | 4/2014 |
| KR | 0137727 B1 | 11/1994 |
| KR | 2010-0115994 A | 10/2010 |
| KR | 2017-0051358 | 5/2017 |

OTHER PUBLICATIONS

Extended European Search Report dated Jan. 24, 2019, issued for the corresponding European Patent Application No. 18193277.3-1102.

* cited by examiner

POLY(AMIDE-IMIDE) COPOLYMER, COMPOSITION FOR PREPARING POLY(AMIDE-IMIDE) COPOLYMER, ARTICLE INCLUDING POLY(AMIDE-IMIDE) COPOLYMER, AND DISPLAY DEVICE INCLUDING THE ARTICLE

CROSS-REFERENCE TO RELATED APPLICATION

This application claims priority to Korean Patent Application Nos. 10-2017-0115219 and 10-2018-0106898, filed on Sep. 8, 2017 and Sep. 7, 2018, respectively, and all the benefits accruing therefrom under 35 U.S.C. § 119, the content of which is incorporated herein in its entirety by reference.

BACKGROUND

1. Field

This disclosure relates to a poly(amide-imide) copolymer, a composition for preparing a poly(amide-imide) copolymer, an article including a poly(amide-imide) copolymer, and to a display device including the article.

2. Description of the Related Art

A flexible display, which is not restricted by time and place, that is thin and flexible like paper, ultra light, and consumes a small amount of electricity, has been increasingly in demand as a display for visualizing various information and delivering it to the users. The flexible display may be realized by using a flexible substrate, organic and inorganic materials for a low temperature process, flexible electronics, encapsulation, packaging, and the like.

A transparent plastic film for replacing a conventional window cover glass to be used in a flexible display must have high toughness and excellent optical properties. Desired optical properties include high light transmittance, low haze, low yellowness index, low YI difference after exposure to UV light, and the like.

There still remains a need for polymers having excellent optical and mechanical properties that could be used in transparent plastic films.

SUMMARY

An embodiment provides a poly(amide-imide) copolymer having improved optical and mechanical properties.

Another embodiment provides a composition for preparing a poly(amide-imide) copolymer.

Still another embodiment provides an article including a poly(amide-imide) copolymer.

Yet another embodiment provides a display device including an article including the poly(amide-imide) copolymer.

According to an embodiment, provided is a poly(amide-imide) copolymer that is a reaction product of a substituted or unsubstituted aromatic diamine having a maximum absorption wavelength in a range from 500 nanometers to 700 nanometers in a visible light region, a diamine represented by Chemical Formula 1, a dicarbonyl compound represented by Chemical Formula 2, and a tetracarboxylic acid dianhydride represented by Chemical Formula 3:

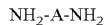    Chemical Formula 1 wherein in Chemical Formula 1,

A is a ring system including two or more C6 to C30 aromatic rings linked by a single bond, wherein each of the two or more of the aromatic rings is independently unsubstituted or substituted by an electron-withdrawing group;

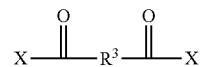

Chemical Formula 2 wherein, in Chemical Formula 2, $R^3$ is a substituted or unsubstituted phenylene or a substituted or unsubstituted biphenylene group, and each X is an identical or a different halogen atom,

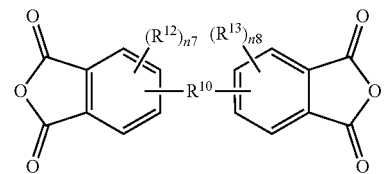

Chemical Formula 3 wherein, in Chemical Formula 3, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, n7 and n8 are each independently an integer ranging from 0 to 3.

The substituted or unsubstituted aromatic diamine having a maximum absorption wavelength in a range from 500 nanometers to 700 nanometers in a visible light region includes a substituted or unsubstituted aromatic diamine having a maximum absorption wavelength in a range from 550 nanometers to 650 nanometers in a visible light region.

The substituted or unsubstituted aromatic diamine having a maximum absorption wavelength in a range from 500 nanometers to 700 nanometers in a visible light region includes a diamine represented by Chemical Formula 4:

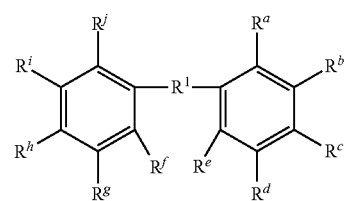

Chemical Formula 4 wherein, in Chemical Formula 4, $R^1$ is represented by —C(=O)— or -(L$^1$)-N=N-(L$^2$)-, wherein L$^1$ and L$^2$ are each independently single bond, a C1 to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof, and when $R^1$ is represented by —C(=O)—, $R^e$ and $R^f$ are linked to each other to form —C(=O)—, and $R^a$ to $R^d$ and $R^g$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, provided that two of $R^a$ to $R^d$, or two of $R^g$ to $R^j$ are amino groups; and when $R^1$ is represented by -(L$^1$)-N=N-(L$^2$)-, $R^a$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, provided that two of $R^a$ to $R^d$, or two of $R^f$ to $R^j$ are amino groups.

The substituted or unsubstituted aromatic diamine having a maximum absorption wavelength in a range from 500 nanometers to 700 nanometers in a visible light region includes at least one of a diamine represented by Chemical Formula 4-1 and a diamine represented by Chemical Formula 4-2:

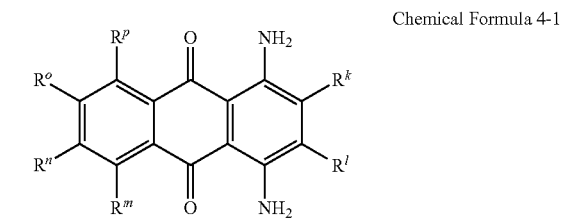

Chemical Formula 4-1

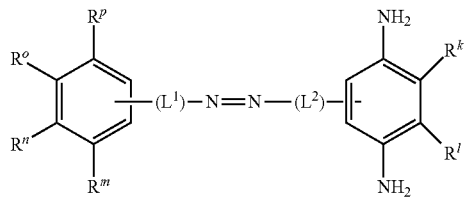

Chemical Formula 4-2 wherein, in Chemical Formulae 4-1 and 4-2, $R^k$ to $R^p$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, and wherein in Chemical Formula 4-2, L$^1$ and L$^2$ are each independently single bond, a C1 to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof.

In Chemical Formulae 4-1 and 4-2, $R^k$ and $R^l$ may be each independently hydrogen, deuterium, a halogen, hydroxyl group, cyano group, a substituted or unsubstituted C1 to C20 alkyl group, or a substituted or unsubstituted C6 to C20 aryl group, and all of $R^m$ to $R^p$ may be hydrogen atoms.

The substituted or unsubstituted aromatic diamine having a maximum absorption wavelength in a range from 500 nanometers to 700 nanometers in a visible light region includes a diamine represented by Chemical Formula 4-1:

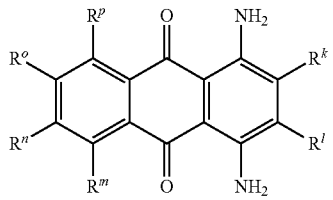

Chemical Formula 4-1 wherein, in Chemical Formula 4-1, $R^k$ and $R^l$ may be each independently hydrogen, deuterium, a halogen, cyano group, a substituted or unsubstituted C1 to C20 alkyl group, or a substituted or unsubstituted C6 to C20 aryl group, and all of $R^m$ to $R^p$ may be hydrogen atoms.

The diamine represented by Chemical Formula 1 may have a ring system including two C6 to C12 aromatic rings linked by a single bond, wherein each of the two C6 to C12 aromatic rings may be substituted by an electron-withdrawing group selected from a halogen atom, a nitro group, a cyano group, a C1 or C2 haloalkyl group, a C2 to C6 alkanoyl group, or a C1 to C6 ester group.

The diamine represented by Chemical Formula 1 may include at least one selected from the diamines represented by chemical formulae:

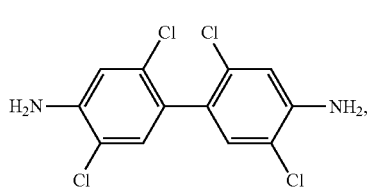

-continued

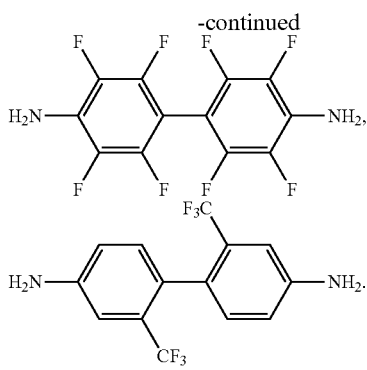

The diamine represented by Chemical Formula 1 may include the diamine represented by Chemical Formula A:

Chemical Formula A

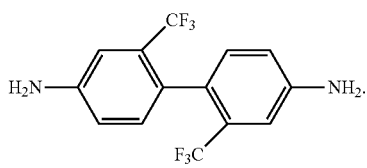

In Chemical Formula 2, $R^3$ may be a phenylene group, and each X may be independently Cl or Br.

The tetracarboxylic acid dianhydride represented by Chemical Formula 3 may include at least one selected from 3,3',4,4'-biphenyl tetracarboxylic dianhydride (BPDA), 3,3', 4,4'-diphenylsulfone tetracarboxylic dianhydride (DSDA), 4,4'-(hexafluoroisopropylidene)diphthalic anhydride (6FDA), and 4,4'-oxydiphthalic anhydride (ODPA).

The tetracarboxylic acid dianhydride represented by Chemical Formula 3 may include a combination of 3,3',4, 4'-biphenyl tetracarboxylic dianhydride (BPDA) and 4,4'-(hexafluoroisopropylidene)diphthalic anhydride (6FDA).

An amount of the substituted or unsubstituted aromatic diamine having a maximum absorption wavelength in a range from 500 nanometers to 700 nanometers in a visible light region may be less than or equal to 200 parts per million (ppm) based on the total weight of the poly(amide-imide) copolymer.

According to an embodiment, provided is a composition for preparing a poly(amide-imide) copolymer including a diamine represented by Chemical Formula 5, and a tetracarboxylic acid dianhydride represented by Chemical Formula 3:

to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, $1 \leq q \leq 10$, —C(CH$_3$)$_2$—, —C(CF$_3$)$_2$—, or a combination thereof, and when $R^1$ is represented by —C(=O)—, $R^e$ and $R^f$ are linked to each other to form —C(=O)—, and $R^b$, $R^c$, and $R^g$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —$OR^{201}$, wherein, $R^{201}$ is a C1 to C10 aliphatic organic group, or —$SiR^{210}R^{211}R^{212}$, wherein, $R^{210}$, $R^{211}$, and $R^{212}$ are each independently hydrogen, or a C1 to C10 aliphatic organic group; and when $R^1$ is represented by -($L^1$)-N=N-($L^2$)-, $R^b$, $R^c$, and $R^e$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —$OR^{201}$, wherein, $R^{201}$ is a C1 to C10 aliphatic organic group, or —$SiR^{210}R^{211}R^{212}$, wherein, $R^{210}$, $R^{211}$, and $R^{212}$ are each independently hydrogen, or a C1 to C10 aliphatic organic group;

$R^3$ is a substituted or unsubstituted phenylene or a substituted or unsubstituted biphenylene group, A is a ring system including two or more C6 to C30 aromatic rings linked by a single bond, wherein each of the two or more aromatic rings is independently unsubstituted or substituted by an electron-withdrawing group;

Chemical Formula 5

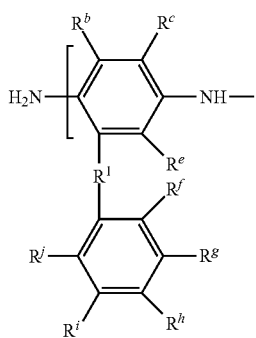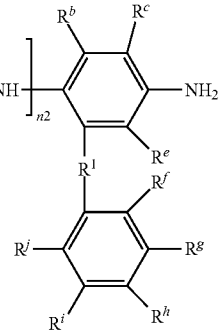

wherein, in Chemical Formula 5, $R^1$ is represented by —C(=O)— or -($L^1$)-N=N-($L^2$)-, wherein $L^1$ and $L^2$ are each independently single bond, a C1 n1 and n2 are the same or different, and each independently a number greater than or equal to 0, provided that both n1 and n2 are not simultaneously 0;

Chemical Formula 3

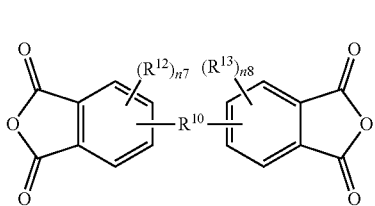

Chemical Formula 3-1

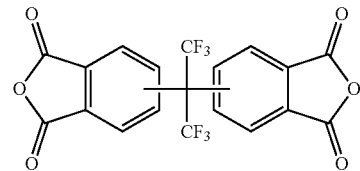

Chemical Formula 3-2

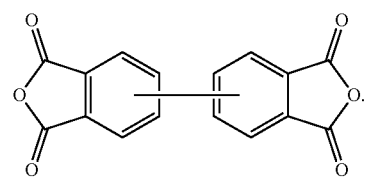

wherein, in Chemical Formula 3, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein $R^{201}$ is a C1 to C10 aliphatic organic group, or a silyl group of formula —SiR$^{210}$R$^{211}$R$^{212}$, wherein $R^{210}$, $R^{211}$, and $R^{212}$ are each independently hydrogen or a C1 to C10 aliphatic organic group, and n7 and n8 are each independently an integer ranging from 0 to 3.

The composition may further comprise a compound represented by Chemical Formula 5-1:

Chemical Formula 5-1

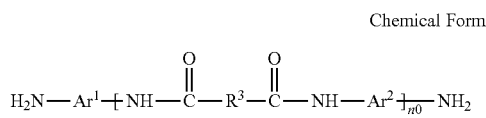

wherein in Chemical Formula 5-1, $R^3$ is a substituted or unsubstituted phenylene or a substituted or unsubstituted biphenylene group, $Ar^1$ and $Ar^2$ are each independently a ring system including two or more C6 to C30 aromatic rings linked by a single bond, wherein each of the two or more aromatic rings is independently unsubstituted or substituted by an electron-withdrawing group, and n0 is a number greater than or equal to 0.

In the composition, $R^1$ of Chemical Formula 5 is —C(=O)—, $R^b$, $R^c$, and $R^g$ to $R^j$ are each independently hydrogen, deuterium, a halogen, hydroxyl group, cyano group, a substituted or unsubstituted C1 to C20 alkyl group, or a substituted or unsubstituted C6 to C20 aryl group, and A is a ring system including two phenylene groups linked by a single bond, wherein each of the two phenylene groups is independently substituted by an electron-withdrawing group selected from a halogen atom, nitro group, cyano group, a C1 to C2 haloalkyl group, a C2 to C6 alkanoyl group, and a C1 to C6 ester group.

The tetracarboxylic acid dianhydride represented by Chemical Formula 3 may be a combination of the compound represented by Chemical Formula 3-1 and the compound represented by Chemical Formula 3-2:

According to another embodiment, provided is an article including a poly(amide-imide) copolymer according to an embodiment.

The article may be a film, wherein the film may have a* of −3.0 to 3.0 and b* of −3.0 to 3.0 at the color coordinate.

The article may be a film, wherein the film may have a transmittance of greater than or equal to 85%, and a Yellowness Index (YI) of −4.0 to 3.0.

According to another embodiment, provided is a display device including an article according to an embodiment.

Hereinafter, further embodiments will be described in detail.

DETAILED DESCRIPTION

Figure 1:
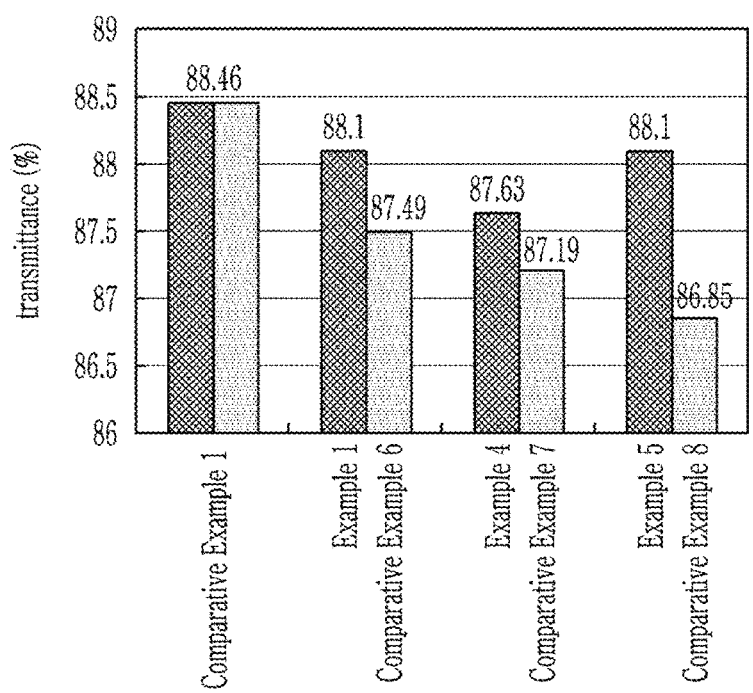
FIG. 1 is a diagram showing transmittances of the films prepared by using a compound selected from CNAQ (Example 1 and Comparative Example 6), CLAQ (Example 4 and Comparative Example 7), and DAAQ (Example 5 and Comparative Example 8), either by copolymerizing the compound with the other monomers for forming a poly(amide-imide) copolymer (Examples 1, 4, and 5) or by merely mixing the compound with a pre-prepared poly(amide-imide) copolymer (in Comparative Examples 6 to 8), compared with a transmittance of the film prepared not by using any of the compound, but by using only the other monomers for preparing the poly(amide-imide) copolymer (Comparative Example 1)

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) as used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxy group, a nitro group, a cyano group, an amino group (—$NH_2$, —$NH(R^{100})$ or —$N(R^{101})(R^{102})$, wherein $R^{100}$, $R^{101}$, and $R^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, and propoxy.

As used herein, when a definition is not otherwise provided, the term "alkanoyl" represents "alkyl-C(=O)—", wherein the term "alkyl" has the same meaning as described above.

As used herein, the term "aryl group", which is used alone or in combination, refers to an aromatic hydrocarbon group containing at least one ring. Non-limiting examples of the aryl group are phenyl, naphthyl, and tetrahydronaphthyl.

As used herein, the term "alkylene" indicates a straight or branched saturated aliphatic hydrocarbon group having a valence of at least two, optionally substituted with one or more substituents where indicated, provided that the valence of the alkylene group is not exceeded.

As used herein, the term "cycloalkylene" indicates a saturated cyclic hydrocarbon group having a valence of at least two, optionally substituted with one or more substituents where indicated, provided that the valence of the cycloalkylene group is not exceeded.

As used herein, when a definition is not otherwise provided, the term "arylene" indicates a divalent or higher valent group formed by the removal of two or more hydrogen atoms from one or more rings of an arene, wherein the hydrogen atoms may be removed from the same or different rings of the arene.

As used herein, when a specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refer to a C1 to C30 alkoxy group, for example, a C1 to C18 alkoxy group, the term "ester group" refers to a C2 to C30 ester group, for example, a C2 to C18 ester group, the term "ketone group" refers to a C3 to C30 ketone group, for example, a C3 to C18 ketone group, the term "aryl group" refers to a C6 to C30 aryl group, for example, a C6 to C18 aryl group, the term "alkenyl group" refers to a C2 to C30 alkenyl group, for example, a C2 to C18 alkenyl group, the term "alkynyl group" refers to a C2 to C30 alkynyl group, for example, a C2 to C18 alkynyl group, the term "alkylene group" refers to a C1 to C30 alkylene group, for example, a C1 to C18 alkylene group, and the term "arylene group" refers to a C6 to C30 arylene group, for example, a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, for example, through —S(=O)$_2$—, for example a C6 to C30 aryl group or a C6 to C30 arylene group, for example, a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example, a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group including 1 to 3 heteroatoms selected from O, S, N, P, Si, and a combination thereof, in one ring.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "combination" commonly refers to mixing or copolymerization.

As used herein, when a definition is not otherwise provided, "polyimide" may refer to not only "polyimide" itself which is an imidization product of a polyamic acid, but also "polyamic acid" or a combination of the "polyimide" itself and "polyamic acid". Further, the terms "polyimide" and "polyamic acid" may be understood as the same material.

In addition, in the specification, the mark "*" may refer to a point of attachment to another atom.

Research efforts towards converting mobile devices, such as, a mobile phone or a tablet personal computer, and the like, to light, flexible, and bendable devices are currently ongoing. In this regard, a flexible and transparent window film for a display device having high hardness for replacing a rigid glass placed on top of the mobile devices is desired.

To be used as a window film, good optical and mechanical properties are desired. Desired optical properties include high light transmittance, low yellowness index (YI), low YI difference after exposure to UV light, low haze, low refractive index (low reflection index), and the like. Mechanical properties, such as hardness, may be supplemented with a hard coating layer, but a base film having high toughness may ensure that a final film has high mechanical properties.

A polyimide or poly(amide-imide) copolymer has excellent mechanical, thermal, and optical properties, and thus, is widely used as a plastic substrate for a display device, such as an organic light emitting diode (OLED), liquid crystal display (LCD), and the like. In order to use polyimide or poly(amide-imide) film as a window film for a flexible display device, however, further improved mechanical and optical properties, such as, high hardness (or modulus), toughness, high light transmittance, low yellowness index, low refractive index, and the like, are desired. It is difficult, however, to improve both mechanical and optical properties of the film at the same time, as the two properties, especially, tensile modulus and yellowness index of a polyimide or poly(amide-imide) film are in a trade-off relationship with regard to each other.

Conventionally, in order to control yellowness of a polyimide, a method of increasing a distance between two polyimide chains, a method of forming a cross-linking between two polyimide chains to inhibit electron shares therebetween, or a method of introducing an atom having a high electronevativity, such as, for example, F, Cl, and the like, have been tried. In other methods, a blue dye or pigment has been added to a polyimide solution for fabricating a film, or a blue layer has been coated on a surface of a polyimide film. However, when a blue dye or pigment is merely mixed to a polyimide solution, there may be a dispersion problem, such as, for example, that the dye is non-homogeneously mixed or is aggregated, or if the dye or pigment is not compatible with the polymers forming a film, the dye or pigment may release on a surface of the film as time goes on. Further, in case a blue layer is coated on a surface of a polyimide film, production yield may be lowered due to the increase of process number, as well as the coating layer may be delaminated, while production cost may increase, and the appearance of the film may be deteriorated. Moreover, a process problem may occur due to the incompatibility with the materials for forming a film or a solvent. Meanwhile, when increasing a distance between polyimide chains or introducing an atom having a high electronegativity to the polyimide, mechanical properties, such as, for example, a surface hardness, of the film may be deteriorated as the electron sharing among polyimide chains is inhibited.

In this regard, the inventors have studied to develop a poly(amide-imide) copolymer having good optical properties, such as, for example, a low yellowness index, while minimizing reduction of transmittance, as well as maintaining good mechanical properties, and a composition for preparing the poly(amide-imide). As a result, they have found a new composition for preparing a poly(amide-imide) copolymer including a substituted or unsubstituted aromatic diamine having a maximum absorption wavelength in a range from 500 nanometers (nm) to 700 nm in a visible light region, along with an aromatic tetracarboxylic dianhydride, an aromatic diamine, and an aromatic dicarbonyl compound, and confirmed that the poly(amide-imide) copolymer prepared from the composition has a significantly reduced yellowness index, while being hardly deteriorated in transmittance, as well as maintaining good mechanical properties.

For example, the poly(amide-imide) copolymer prepared from the composition may have a* and b* of −3.0 to 3.0, respectively, at the CIE color coordinate, for example, −2.5 to 2.5, respectively, for example, −2.0 to 2.0, respectively, for example, −1.5 to 1.5, respectively, for example, −1.0 to 1.0, respectively, and for example, −0.5 to 0.5, respectively. The CIE Lab color system includes "L" value indicating "Brightness", and "a*" and "b*" values indicating "Hue" and "Saturation", respectively, wherein "+a*" indicates red, "−a*" indicates green, "+b*" indicates yellow, "−b*" indicates blue, and thus, as "+b*" indicating yellow decreases, yellowness decreases. Therefore, the poly(amide-imide) copolymer having the above values of "a*" and "b*" according to an embodiment has a transmittance of greater than or equal to 85% in a wavelength range of 350 nm to 750 nm, and a YI of −4.0 to 3.0, for example, −3.5 to 3.0, for example, −3.0 to 2.5, for example, −2.5 to 2.5, for example, −2.0 to 2.0, for example, −1.5 to 2.0, for example, −1.5 to 1.5, for example, −1.5 to 1.0, and for example, −1.0 to 1.0, and thus, may have a greatly decreased YI, while a transmittance being hardly deteriorated.

Accordingly, an embodiment provides a poly(amide-imide) copolymer that is a reaction product of a substituted or unsubstituted aromatic diamine having a maximum absorption wavelength in a range from 500 nm to 700 nm in a visible light region, a diamine represented by Chemical Formula 1, a dicarbonyl compound represented by Chemical Formula 2, and a tetracarboxylic acid dianhydride represented by Chemical Formula 3:

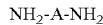   Chemical Formula 1 wherein in Chemical Formula 1,

A is a ring system including two or more C6 to C30 aromatic rings linked by a single bond, wherein each of the two or more aromatic rings is independently unsubstituted or substituted by an electron-withdrawing group;

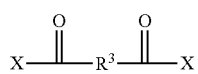   Chemical Formula 2 wherein, in Chemical Formula 2, $R^3$ is a substituted or unsubstituted phenylene or a substituted or unsubstituted biphenylene group, and each X is an identical or a different halogen atom.

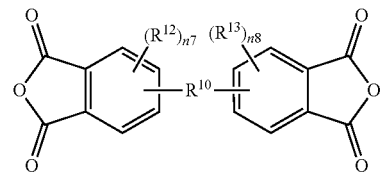   Chemical Formula 3 wherein, in Chemical Formula 3, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, n7 and n8 are each independently an integer ranging from 0 to 3.

The substituted or unsubstituted aromatic diamine having a maximum absorption wavelength in a range from 500 nm to 700 nm in a visible light region may include a substituted or unsubstituted aromatic diamine having a maximum absorption wavelength in a range from 550 nm to 650 nm, for example, in a range from 580 nm to 630 nm, in a visible light region.

The substituted or unsubstituted aromatic diamine having a maximum absorption wavelength in a range from 500 nm to 700 nm in a visible light region may include a diamine represented by Chemical Formula 4:

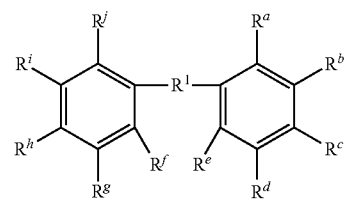   Chemical Formula 4 wherein, in Chemical Formula 4, $R^1$ is represented by —C(=O)— or -(L$^1$)-N=N-(L$^2$)-, wherein L$^1$ and L$^2$ are each independently single bond, a C1 to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof, and when $R^1$ is represented by —C(=O)—, $R^e$ and $R^f$ are linked to each other to form —C(=O)—, and $R^a$ to $R^d$ and $R^g$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, provided that two of R$^a$ to R$^d$, or two of R$^g$ to R$^j$ are amino groups; and when R$^1$ is represented by -(L$^1$)-N=N-(L$^2$)-, R$^a$ to R$^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, provided that two of R$^a$ to R$^e$, or two of R$^f$ to R$^j$ are amino groups.

The substituted or unsubstituted aromatic diamine having a maximum absorption wavelength in a range from 500 nm to 700 nm in a visible light region may include at least one of a diamine represented by Chemical Formula 4-1 and a diamine represented by Chemical Formula 4-2:

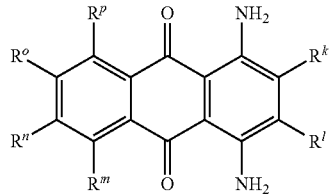

Chemical Formula 4-1

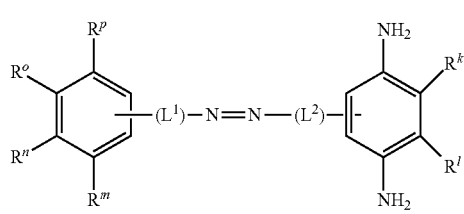

Chemical Formula 4-2 wherein, in Chemical Formulae 4-1 and 4-2,

R$^k$ to R$^p$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, and wherein in Chemical Formula 4-2, L$^1$ and L$^2$ are each independently single bond, a C1 to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof.

In Chemical Formulae 4-1 and 4-2, R$^k$ and R$^l$ may be each independently hydrogen, deuterium, a halogen, hydroxyl group, cyano group, a substituted or unsubstituted C1 to C20 alkyl group, or a substituted or unsubstituted C6 to C20 aryl group, and all of R$^m$ to R$^p$ may be hydrogen atoms.

In an exemplary embodiment, the substituted or unsubstituted aromatic diamine having a maximum absorption wavelength in a range from 500 nm to 700 nm in a visible light region may include a diamine represented by Chemical Formula 4-1:

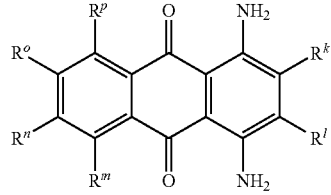

Chemical Formula 4-1 wherein, in Chemical Formula 4-1,

R$^k$ and R$^l$ may be each independently hydrogen, deuterium, a halogen, cyano group, a substituted or unsubstituted C1 to C20 alkyl group, or a substituted or unsubstituted C6 to C20 aryl group, and all of R$^m$ to R$^p$ may be hydrogen atoms.

In an exemplary embodiment, the diamine represented by Chemical Formula 4-1 may be at least one of the compounds represented by Chemical Formulae 4-1a, 4-1 b, and 4-1c, but is not limited thereto:

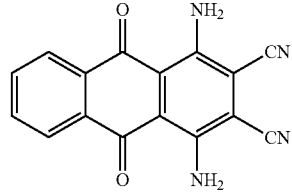

Chemical Formula 4-1a

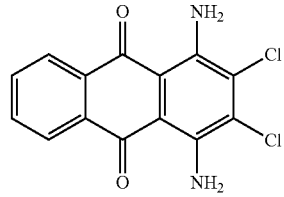

Chemical Formula 4-1b

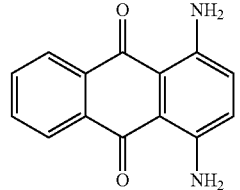

Chemical Formula 4-1c

The compound represented by Chemical Formula 4-1a has a maximum absorption wavelength at about 623 nm in a visible light region, the compound represented by Chemical Formula 4-1b at about 605 nm in a visible light region, and the compound represented by Chemical Formula 4-1c at about 582 nm in a visible light region.

The compounds represented by Chemical Formulae 4-1a to 4-1c are commercially available from Tokyo Chemical Industries, Aldrich Com., Ltd., and the like, or may be synthesized by a method known to persons skilled in the art.

The diamine represented by Chemical Formula 1 may have a ring system including two C6 to C12 aromatic rings linked by a single bond, wherein each of the two C6 to C12 aromatic rings may be substituted by an electron-withdrawing group selected from a halogen atom, a nitro group, a cyano group, a C1 or C2 haloalkyl group, a C2 to C6 alkanoyl group, or a C1 to C6 ester group.

The electron-withdrawing groups that may be substituted to the each aromatic ring of the diamine represented by Chemical Formula 1 may be selected from a halogen atom, —$CF_3$, —$CCl_3$, —$CBr_3$, or —$Cl_3$.

The diamine represented by Chemical Formula 1 may include at least one selected from the diamines represented by chemical formulae:

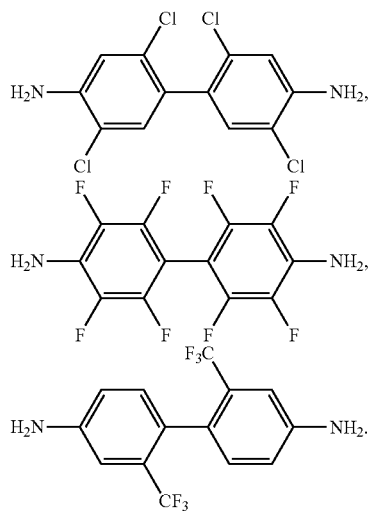

In an exemplary embodiment, the diamine represented by Chemical Formula 1 may include the diamine represented by Chemical Formula A, i.e., 2,2'-bis(trifluoromethyl)benzidine (TFDB):

Chemical Formula A

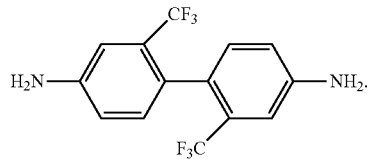

In Chemical Formula 2, $R^3$ may be a phenylene group, and each X may be independently Cl or Br.

In an exemplary embodiment, the dicarbonyl compound represented by Chemical Formula 2 may be terephthaloyl chloride (TPCl).

The tetracarboxylic acid dianhydride represented by Chemical Formula 3 may include at least one selected from 3,3',4,4'-biphenyl tetracarboxylic dianhydride (BPDA), 3,3',4,4'-diphenylsulfone tetracarboxylic dianhydride (DSDA), 4,4'-(hexafluoroisopropylidene)diphthalic anhydride (6FDA), and 4,4'-oxydiphthalic anhydride (ODPA), and is not limited thereto.

In an exemplary embodiment, the tetracarboxylic acid dianhydride represented by Chemical Formula 3 may be a combination of the compound represented by Chemical Formula 3 wherein $R^{10}$ is a single bond, and both n7 and n8 are 0, for example, 3,3',4,4'-biphenyl tetracarboxylic dianhydride (BPDA), and the compound represented by Chemical Formula 3 wherein $R^{10}$ is —$C(C_nF_{2n+1})_2$— wherein $1 \le n \le 10$, and both n7 and n8 are 0, for example, 4,4'-(hexafluoroisopropylidene)diphthalic anhydride (6FDA).

At least one of the substituted or unsubstituted aromatic diamine having a maximum absorption wavelength in a range from 500 nm to 700 nm in a visible light region and the diamine represented by Chemical Formula 1 may react with a dicarbonyl compound represented by Chemical Formula 2 to provide an amide structural unit in a poly(amide-imide) copolymer, and at least one of the substituted or unsubstituted aromatic diamine having a maximum absorption wavelength in a range from 500 nm to 700 nm in a visible light region and the diamine represented by Chemical Formula 1 may react with a tetracarboxylic acid dianhydride represented by Chemical Formula 3 to provide an imide structural unit in a poly(amide-imide) copolymer.

A conventional method for preparing a poly(amide-imide) copolymer may include preparing an amide structural unit by reacting a dicarbonyl compound represented by Chemical Formula 2, such as, for example, a dicarbonyl chloride, with a diamine, for example, a substituted or unsubstituted aromatic diamine having a maximum absorption wavelength in a range from 500 nm to 700 nm in a visible light region and/or a diamine represented by Chemical Formula 1, and further adding and reacting an additional diamine, such as, for example, a substituted or unsubstituted aromatic diamine having a maximum absorption wavelength in a range from 500 nm to 700 nm in a visible light region and/or a diamine represented by Chemical Formula 1, along with a tetracarboxylic acid dianhydride, for example, a tetracarboxylic acid dianhydride represented by Chemical Formula 3, to prepare an amic acid structural unit with the diamine and the tetracarboxylic acid dianhydride, as well as to link the prepared amide structural unit and the amic acid structural unit to provide a poly(amide-amic acid) copolymer. Thus prepared poly(amide-amic acid) copolymer may be partially or completely imidized by chemical and/or thermal imidization reaction. Then, the obtained poly(amide-amic acid and/or imide) copolymer may be precipitated, filtered, and/or further heat-treated to provide a final poly(amide-imide) copolymer. This method is well known to persons skilled in the art to which the present inventive concept pertains.

An amide structural unit prepared by reacting a substituted or unsubstituted aromatic diamine having a maximum absorption wavelength in a range from 500 nm to 700 nm in a visible light region, for example, a diamine represented by Chemical Formula 4, and wherein in Chemical Formula 4, both $R^a$ and $R^d$ are amino groups, with a dicarbonyl compound represented by Chemical Formula 2 may be represented by Chemical Formula 7:

Chemical Formula 7

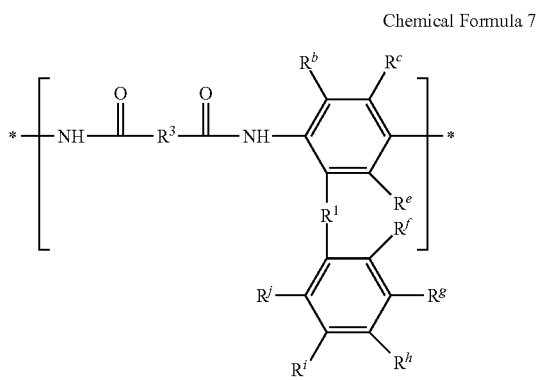

wherein in Chemical Formula 7,

R³ is the same as defined for Chemical Formula 2, and R¹, $R^b$, $R^c$, and $R^e$ to $R^j$ are the same as defined in Chemical Formula 4.

An amide structural unit prepared by reacting a diamine represented by Chemical Formula 1 and a dicarbonyl compound represented by Chemical Formula 2 may be represented by Chemical Formula 8:

Chemical Formula 8

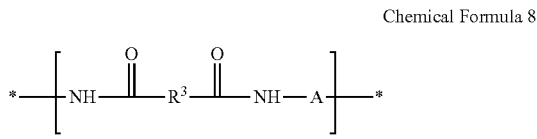

wherein in Chemical Formula 8,

R³ is the same as defined for Chemical Formula 2, and A is the same as defined for Chemical Formula 1.

Meanwhile, an imide structural unit prepared by reacting a diamine represented by Chemical Formula 4 and a tetracarboxylic acid dianhydride represented by Chemical Formula 3 may be represented by Chemical Formula 9, and an imide structural unit prepared by reacting a diamine represented by Chemical Formula 1 and a tetracarboxylic acid dianhydride represented by Chemical Formula 3 may be represented by Chemical Formula 10:

Chemical Formula 9

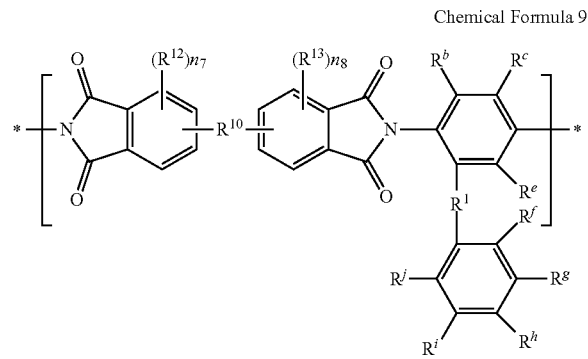

wherein in Chemical Formula 9, $R^{10}$, $R^{12}$, $R^{13}$, n7 and n8 are the same as defined for Chemical Formula 3, and each of R¹, $R^b$, $R^c$, and $R^e$ to $R^j$ are the same as defined for Chemical Formula 4;

Chemical Formula 10

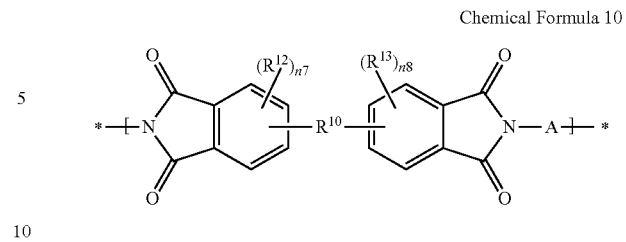

wherein in Chemical Formula 10,

A is the same as defined for Chemical Formula 1, and $R^{10}$, $R^{12}$, $R^{13}$, n7 and n8 are the same as defined for Chemical Formula 3.

Therefore, a poly(amide-imide) copolymer according to an embodiment may include an amide structural unit represented by at least one of Chemical Formula 7 and Chemical Formula 8, and an imide structural unit represented by at least one of Chemical Formula 9 and Chemical Formula 10, provided that the poly(amide-imide) copolymer is not consisting of an amide structural unit represented by Chemical Formula 7 and an imide structural unit represented by Chemical Formula 9, or of an amide structural unit represented by Chemical Formula 8 and an imide structural unit represented by Chemical Formula 10.

In an exemplary embodiment, an amount of the substituted or unsubstituted aromatic diamine having a maximum absorption wavelength in a range from 500 nm to 700 nm in a visible light region may be less than or equal to 200 ppm, for example, less than or equal to 150 ppm, for example, less than or equal to 100 ppm, for example, less than or equal to 90 ppm, for example, less than or equal to 80 ppm, for example, less than or equal to 70 ppm, for example, less than or equal to 60 ppm, for example, less than or equal to 50 ppm, for example, less than or equal to 40 ppm, for example, less than or equal to 30 ppm, for example, less than or equal to 20 ppm, for example, less than or equal to 15 ppm, for example, less than or equal to 10 ppm, for example, less than or equal to 5 ppm, and the like, based on the total weight of the prepared poly(amide-imide) copolymer.

The poly(amide-imide) copolymer prepared by polymerizing a substituted or unsubstituted aromatic diamine having a maximum absorption wavelength in a range from 500 nm to 700 nm in a visible light region in an amount of the above range, a diamine represented by Chemical Formula 1, a dicarbonyl compound represented by Chemical Formula 2, and a tetracarboxylic acid dianhydride represented by Chemical Formula 3 may have a significantly decreased YI, while a transmittance being hardly deteriorated. For example, a film containing a poly(amide-imide) copolymer prepared by using a substituted or unsubstituted aromatic diamine having a maximum absorption wavelength in a range from 500 nm to 700 nm in a visible light region, for example, a diamine represented by Chemical Formula 4-1a, in an amount of the above range, for example, about 150 ppm, based on the total weight of the poly(amide-imide) copolymer, may have a transmittance of greater than 85% in a wavelength range of 350 nm to 750 nm, and YI of −4.0, i.e., which indicates that the film may not appear yellow at all. Further, a film containing a poly(amide-imide) copolymer prepared by using the diamine represented by Chemical Formula 4-1a in an amount of about 80 ppm, based on the total weight of the poly(amide-imide) copolymer, may have a transmittance of greater than 87% in a wavelength range of 350 nm to 750 nm, and YI of greater than −1.0, and a film containing a poly(amide-imide) copolymer prepared by using the diamine represented by Chemical Formula 4-1a in an amount of about 40 ppm, based on the total weight of the poly(amide-imide) copolymer, may have a transmittance of about 88% in a wavelength range of 350 nm to 750 nm, and YI of less than 0.5.

As such, a poly(amide-imide) copolymer prepared by including a substituted or unsubstituted aromatic diamine having a maximum absorption wavelength in a range from 500 nm to 700 nm in a visible light region as a monomer in an amount of the above range, i.e., a very small amount, may have improved optical properties, such as, for example, a greatly decreased YI, while good mechanical properties not being deteriorated, and thus, may be very advantageous in a use as a window film for a flexible display device.

Meanwhile, as noted from the lately described Comparative Examples, when preparing an article, such as, for example, a film, from a mixture that includes a substituted or unsubstituted aromatic diamine having a maximum absorption wavelength in a range from 500 nm to 700 nm in a visible light region and a pre-prepared poly(amide-imide) copolymer or a precursor thereof, wherein the diamine having a maximum absorption wavelength in a range from 500 nm to 700 nm in a visible light region is not polymerized with the pre-prepared poly(amide-imide) copolymer or a precursor thereof, the film may have a slightly decreased YI, but have a significantly decreased transmittance. That is, an article prepared from a mixture including a pre-prepared poly(amide-imide) copolymer and a substituted or unsubstituted aromatic diamine having a maximum absorption wavelength in a range from 500 nm to 700 nm in a visible light region, wherein the diamine is not copolymerized into the poly(amide-imide) copolymer but is merely mixed therewith, may not have an improvement in optical properties as in the poly(amide-imide) copolymer according to an embodiment.

When preparing a poly(amide-imide) copolymer according to an embodiment, an amount of the other components except for the substituted or unsubstituted aromatic diamine having a maximum absorption wavelength in a range from 500 nm to 700 nm in a visible light region may be appropriately adjusted to obtain a poly(amide-imide) copolymer having a desired mechanical and/or optical properties. For example, considering a desired ratio between amide structural unit and imide structural unit in a poly(amide-imide) copolymer, the dicarbonyl compound represented by Chemical Formula 2 and the tetracarboxylic dianhydride represented by Chemical Formula 3 may be included in a mole ratio from 1:99 to 99:1. For example, the dicarbonyl compound represented by Chemical Formula 2 and the tetracarboxylic dianhydride represented by Chemical Formula 3 may be included in a mole ratio of 10:90 to 90:10, for example, 20:80 to 80:20, for example, 30:70 to 70:30, and for example, 40:60 to 60:40.

Another embodiment provides a composition for preparing a poly(amide-imide) copolymer including a diamine represented by Chemical Formula 5, and a tetracarboxylic acid dianhydride represented by Chemical Formula 3:

Chemical Formula 5

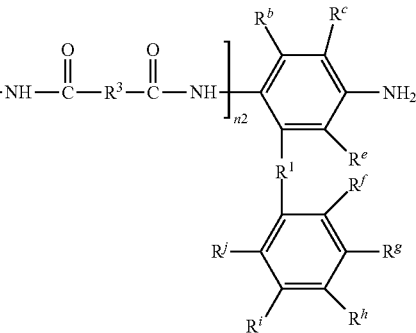

wherein, in Chemical Formula 5, $R^1$ is represented by —C(=O)— or -(L$^1$)-N=N-(L$^2$)-, wherein L$^1$ and L$^2$ are each independently single bond, a C1 to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof, and when $R^1$ is represented by —C(=O)—, $R^e$ and $R^f$ are linked to each other to form —C(=O)—, and $R^b$, $R^c$, and $R^g$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group; and when $R^1$ is represented by -(L$^1$)-N=N-(L$^2$)-, $R^b$, $R^c$, and $R^e$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group;

$R^3$ is a substituted or unsubstituted phenylene or a substituted or unsubstituted biphenylene group, A is a ring system including two or more C6 to C30 aromatic rings linked by a single bond, wherein each of the two or more aromatic rings is independently unsubstituted or substituted by an electron-withdrawing group;

n1 and n2 are the same or different, and are each independently a number greater than or equal to 0, provided that both n1 and n2 are not simultaneously 0;

Chemical Formula 3

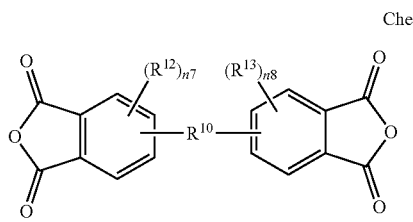

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein $R^{201}$ is a C1 to C10 aliphatic organic group, or a silyl group of formula —SiR$^{210}$R$^{211}$R$^{212}$, wherein $R^{210}$, $R^{211}$, and $R^{212}$ are each independently hydrogen or a C1 to C10 aliphatic organic group, and n7 and n8 are each independently an integer ranging from 0 to 3.

The composition may further comprise a compound represented by Chemical Formula 5-1:

Chemical Formula 5-1

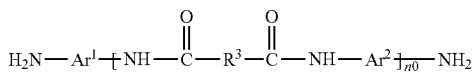

wherein in Chemical Formula 5-1,
$R^3$ is a substituted or unsubstituted phenylene or a substituted or unsubstituted biphenylene group,
$Ar^1$ and $Ar^2$ are each independently a ring system including two or more C6 to C30 aromatic rings linked by a single bond, wherein each of the two or more aromatic rings is independently unsubstituted or substituted by an electron-withdrawing group, and
n0 is a number greater than or equal to 0.

As described above, in a conventional method for preparing a poly(amide-imide) copolymer, an amide structural unit may first be prepared by a reaction of a dicarbonyl compound and a diamine, and then an additional diamine and a dianhydride compound are added to the reactor to prepare an amic acid structural unit, as well as a poly(amide-imide) copolymer by linking the amide structural unit and the amic acid structural unit. Meanwhile, in the process of preparing the amide structural unit, there is a problem that a by-product, such as, halogenated hydrogen (HX: 'H' indicates hydrogen, and 'X' indicates halogen), for example, hydrogen chloride (HCl), is produced. The hydrogen chloride by-product causes corrosion of an element of an apparatus, and thus, should necessarily be removed by a precipitation process. In order to remove the by-product, an HX scavenger, such as a tertiary amine, may be added to the reactor, whereby a salt of HX is produced (please see Reaction Scheme 1 below). If the produced salt of HX is not removed and a film is produced therefrom, serious deterioration of optical properties of the produced film occurs. Therefore, a precipitation process to remove the salt of HX is required in the conventional method for preparing poly (amide-imide) copolymer. The precipitation process increases total process time and cost, while reducing the yield of the final poly(amide-imide) copolymer produced therefrom.

Reaction Scheme 1

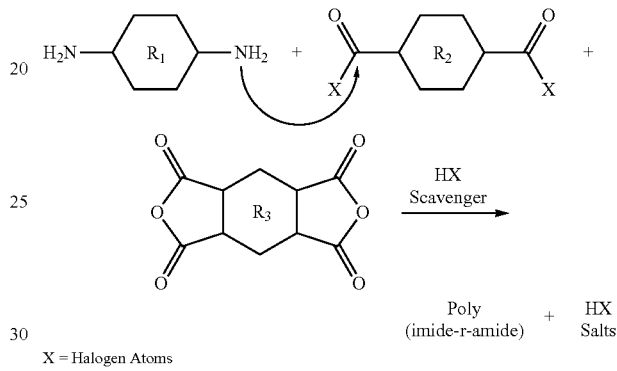

X = Halogen Atoms

In addition to using the conventional method including the precipitation process as described above, it is also possible to prepare a poly(amide-imide) copolymer according to an embodiment by first reacting a diamine and a dicarbonyl compound to prepare an amide structural unit-containing oligomer having amino groups at both ends thereof (hereinafter, referred to as "an amide structural unit-containing oligomer"), and then reacting the prepared amide structural unit-containing oligomer as a diamine monomer with a tetracarboxylic acid dianhydride to provide a poly(amide-imide) copolymer. According to the new method for preparing a poly(amide-imide) copolymer, the precipitation process for removing the HX salt may be omitted, and thus, not only the total process time and cost may be reduced, but also the yield of the final poly(amide-imide) copolymer may increase. Further, it is also possible to obtain a poly(amide-imide) copolymer including a higher amount of an amide structural unit than those prepared by using the conventional method, and thus, an article prepared from the poly(amide-imide) copolymer, for example, a film, may have further improved mechanical properties, while maintaining good optical properties.

Accordingly, another embodiment provides a composition for preparing a poly(amide-imide) copolymer including an amide structural unit-containing oligomer represented by Chemical Formula 5 as a diamine monomer, which may be prepared by reacting a diamine and a dicarbonyl compound, a tetracarboxylic acid dianhydride represented by Chemical Formula 3 for reacting with the oligomer to provide an imide structural unit, and as an additional compound, for example, a diamine represented by Chemical Formula 5-1, for reacting with the tetracarboxylic acid dianhydride represented by Chemical Formula 3 to provide an imide structural unit. In an exemplary embodiment, when n0 of Chemical Formula 5-1 is 0, the compound represented by Chemical Formula 5-1 may be the same as the diamine represented by Chemical Formula 1.

The compound represented by Chemical Formula 5 may be prepared by reacting a dicarbonyl compound represented by Chemical Formula 2 with a substituted or unsubstituted aromatic diamine having a maximum absorption wavelength in a range from 500 nm to 700 nm in a visible light region, for example, the diamine represented by Chemical Formula 4, wherein Ra and Rd are amino groups, and optionally, along with a diamine represented by Chemical Formula 1. In this case, the amount of total diamines may exceed the dicarbonyl compound represented by Chemical Formula 2, and thus, the compound represented by Chemical Formula 5 may have an amino group at each end of two terminals.

In Chemical Formula 5, $R^1$ may be represented by —C(═O)—, $R^b$, $R^c$, and $R^g$ to $R^j$ may be each independently hydrogen, deuterium, a halogen, hydroxyl group, cyano group, a substituted or unsubstituted C1 to C20 alkyl group, or a substituted or unsubstituted C6 to C20 aryl group, and A may be a ring system that includes two phenylene groups linked by a single bond, wherein each of the phenylene groups may be independently substituted or unsubstituted by an electron-withdrawing group selected from a halogen atom, nitro group, cyano group, a C1 to C2 haloalkyl group, a C2 to C6 alkanoyl group, and a C1 to C6 ester group.

In an exemplary embodiment, in Chemical Formula 5, $R^1$ may be represented by —C(═O)—, $R^b$, $R^c$, and $R^g$ to $R^j$ may be each independently hydrogen, deuterium, a halogen, cyano group, or a substituted or unsubstituted C1 to C20 alkyl group, and A may be a ring system that includes two phenylene groups linked by a single bond, wherein each of the phenylene groups may be independently substituted or unsubstituted by an electron-withdrawing group selected from a halogen atom, nitro group, cyano group, and a C1 to C2 haloalkyl group.

In an exemplary embodiment, in Chemical Formula 5, $R^1$ may be represented by —C(═O)—, $R^b$ and $R^c$ may be each independently hydrogen, deuterium, a halogen, cyano group, or a substituted or unsubstituted C1 to C20 alkyl group, all of $R^g$ to $R^j$ may be hydrogen atoms or deuterium atoms, and A may be a ring system that includes two phenylene groups linked by a single bond, wherein each of the phenylene groups may be each independently substituted with a same or different C1 to C2 haloalkyl group.

In an exemplary embodiment, A may be represented by Chemical Formula 6:

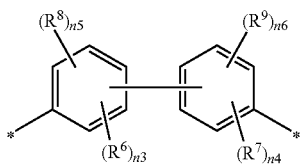

Chemical Formula 6 wherein, in Chemical Formula 6, $R^6$ and $R^7$ are each independently an electron withdrawing group selected from $CF_3$, —$CCl_3$, —$CBr_3$, —$Cl_3$, —$NO_2$, —CN, —$COCH_3$ or —$CO_2C_2H_5$, $R^8$ and $R^9$ are each independently a halogen atom, hydroxyl group, a substituted or unsubstituted C1 to C10 aliphatic organic group, a substituted or unsubstituted C6 to C20 aromatic organic groups, —$OR^{204}$, wherein, $R^{204}$ is a C1 to C10 aliphatic organic group, or —$SiR^{205}R^{206}R^{207}$, wherein $R^{205}$, $R^{206}$ and $R^{207}$ are each independently hydrogen, or a C1 to C10 aliphatic organic group, n3 is an integer ranging from 1 to 4, and n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

In an exemplary embodiment, both $R^6$ and $R^7$ of A may be —$CF_3$, both n3 and n4 may be 1, and both n6 and n7 may be 0 (zero).

Further, $R^3$ of Chemical Formula 5 may be an unsubstituted phenylene group or an unsubstituted biphenylene group.

In an exemplary embodiment, the tetracarboxylic acid dianhydride represented by Chemical Formula 3 may be at least one of the compound represented by Chemical Formula 3-1 and the compound represented by Chemical Formula 3-2, or may be a combination of the compound represented by Chemical Formula 3-1 and the compound represented by Chemical Formula 3-2, but is not limited thereto:

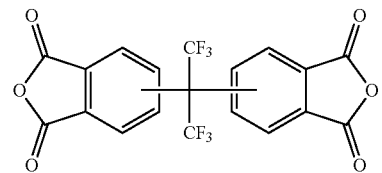

Chemical Formula 3-1

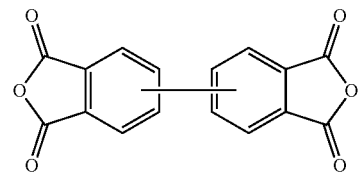

Chemical Formula 3-2

The compound represented by Chemical Formula 3-1 may be 6FDA, the compound represented by Chemical Formula 3-2 may be at least one of s-BPDA, a-BPDA, and i-BPDA, and in an exemplary embodiment, the compound represented by Chemical Formula 3-2 may be s-BPDA.

After preparing a poly(amide-imide) copolymer from the composition, an article may be formed from the poly(amide-imide) copolymer through a dry-wet method, a dry method, or a wet method, but is not limited thereto. When the article is a film, it may be manufactured using a solution including the composition through the dry-wet method, wherein a layer is formed by extruding the solution of the composition from a mouth piece on a supporter, such as drum or an endless belt, drying the layer by evaporating the solvent from the layer until the layer has a self-maintenance property. The drying may be performed by heating, for example, from about 25° C. to about 150° C., within about 1 hour or less. Then, the dried layer may be heated from the room temperature to about 200° C. or to about 300° C. at a heating rate of about 10° C. per minute, and then be allowed to stand at the heated temperature for about 5 minutes to about 30 minutes to obtain a polyimide-based film.

When the surface of the drum and/or the endless belt used for the drying process becomes flat, a layer with a flat surface is formed. The layer obtained after the drying process is delaminated from the supporter, and subjected to a wet process, desalted, and/or desolventized. The manufacturing of the film is completed after the layer is elongated, dried, and/or heat treated.

The heat treatment may be performed at about 200° C. to about 500° C., for example, at about 250° C. to about 400° C., for several seconds to several minutes.

After the heat treatment, the layer may be cooled slowly, for example, at a cooling rate of less than or equal to about 50° C. per minute.

The layer may be formed as a single layer or multiple layers.

Hereafter, the technology of this disclosure is described in detail with reference to examples. The following examples and comparative examples are not restrictive but are illustrative only.

EXAMPLES

Synthesis Examples: Preparation of Oligomer-Like Diamines

Synthesis Example 1: Preparation of an Oligomer-Like Diamine Containing 70 Mol % of an Amide Structural Unit Including CNAQ An oligomer-like diamine containing an amide structural unit that forms an aramid structure represented by Chemical Formula 11 is prepared by reacting TPCl (terephthaloyl chloride), CNAQ (1,4-diamino-2,3-dicyano-anthraquinone) represented by Chemical Formula 4-1a, and TFDB (2,2'-bis(trifluoromethyl)benzidine).

Specifically, 600 grams (g) of N,N-dimethyl acetamide (DMAc) as a solvent is charged into a round-bottomed flask, and 0.99 mole equivalent (31.3 grams) of 2,2'-bis(trifluoromethyl)benzidine (TFDB), 0.08 mole equivalent (0.23 grams) of the CANQ compound represented by Chemical Formula 4-1a, and 1.4 mole equivalent (10.8 grams) of pyridine are added and dissolved therein. After then, 50 milliliters (mL) of DMAc is further added to the flask to dissolve the remaining TFDB. Then, 0.7 mole equivalent (13.9 grams) of terephthaloyl chloride (TPCl) is divided into 4 portions, which are individually added, each portion at a time, to be mixed with the solution containing TFDB and CNAQ. The mixture is then vigorously stirred and reacted for 15 minutes at room temperature.

The resultant solution is further stirred under a nitrogen atmosphere for 2 hours, and then added to 7 liters of water containing 350 g of NaCl. The resulting mixture is stirred for 10 minutes. Subsequently, a solid produced therein is filtered, re-suspended twice by using 5 liters (L) of deionized water, and then re-filtered. The water remaining in the final product on the filter is removed to the extent possible by thoroughly pressing the filtered precipitate on a filter. The precipitate is then dried at 90° C. under vacuum for 48 hours, to obtain an oligomer-like diamine containing 70 mol % of amide structural unit, as a diamine monomer, as a final product. The prepared oligomer-like diamine has a number average molecular weight of about 1,400 grams per mole (gram/mole).

Synthesis Example 2: Preparation of an Oligomer-Like Diamine Containing 70 Mol % of an Amide Structural Unit Including CLAQ An oligomer-like diamine containing an amide structural unit that forms an aramid structure represented by Chemical Chemical Formula 4-1a

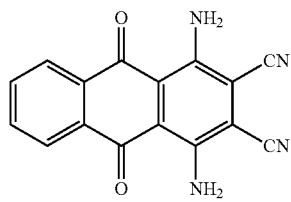

Chemical Formula 11

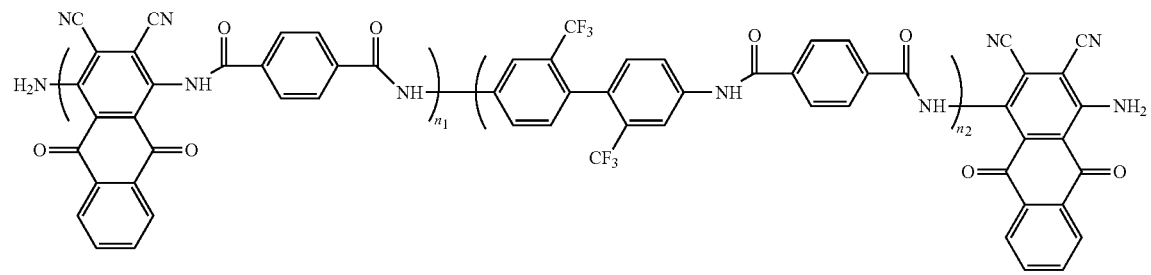

In Chemical Formula 11, n1 and n2 are the same or different, and are each independently a number greater than or equal to 0, provided that both n1 and n2 are not simultaneously 0.

Formula 12 is prepared by reacting TPCl (terephthaloyl chloride), CLAQ (1,4-diamino-2,3-dichloro-anthraquinone) represented by Chemical Formula 4-1b, and TFDB (2,2'-bis(trifluoromethyl)benzidine).

Chemical Formula 4-1b

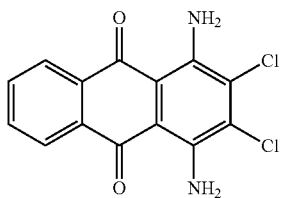

Chemical Formula 12

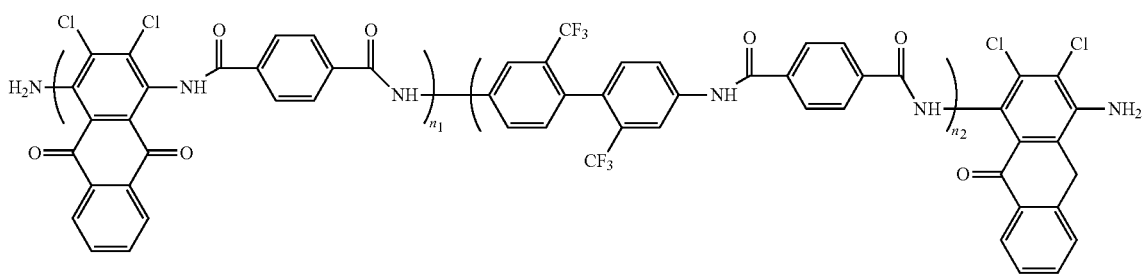

In Chemical Formula 12, n1 and n2 are the same or different, and are each independently a number greater than or equal to 0, provided that both n1 and n2 are not simultaneously 0.

Specifically, 600 g of N,N-dimethyl acetamide (DMAc) as a solvent is charged into a round-bottomed flask, and 0.99 mole equivalent (31.3 grams) of 2,2'-bis(trifluoromethyl)benzidine (TFDB), 0.08 mole equivalent (0.24 grams) of the CLAQ compound represented by Chemical Formula 4-1b, and 1.4 mole equivalent (10.8 grams) of pyridine are added and dissolved therein. After then, 50 milliliters (mL) of DMAC is further added to the flask to dissolve the remaining TFDB. Then, 0.7 mole equivalent (13.9 grams) of terephthaloyl chloride (TPCl) is divided into 4 portions, which are individually added, each portion at a time, to be mixed with the solution containing TFDB and CLAQ. The mixture is then vigorously stirred and reacted for 15 minutes at room temperature.

The resultant solution is further stirred under a nitrogen atmosphere for 2 hours, and then added to 7 liters of water containing 350 g of NaCl. The resulting mixture is stirred for 10 minutes. Subsequently, a solid produced therein is filtered, re-suspended twice by using 5 liters (L) of deionized water, and then re-filtered. The water remaining in the final product on the filter is removed to the extent possible by thoroughly pressing the filtered precipitate on a filter. The precipitate is then dried at 90° C. under vacuum for 48 hours, to obtain an oligomer-like diamine containing 70 mol % of amide structural unit, as a diamine monomer, as a final product. The prepared oligomer-like diamine has a number average molecular weight of about 1,400 grams per mole (gram/mole).

Synthesis Example 3: Preparation of an Oligomer-Like Diamine Containing 70 Mol % of an Amide Structural Unit Including DAAQ An oligomer-like diamine containing an amide structural unit that forms an aramid structure represented by Chemical Formula 13 is prepared by reacting TPCl (terephthaloyl chloride), DAAQ (1,4-diamino-anthraquinone) represented by Chemical Formula 4-1c, and TFDB (2,2'-bis(trifluoromethyl)benzidine).

Chemical Formula 4-1c

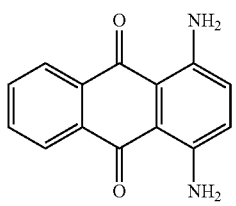

Chemical Formula 13

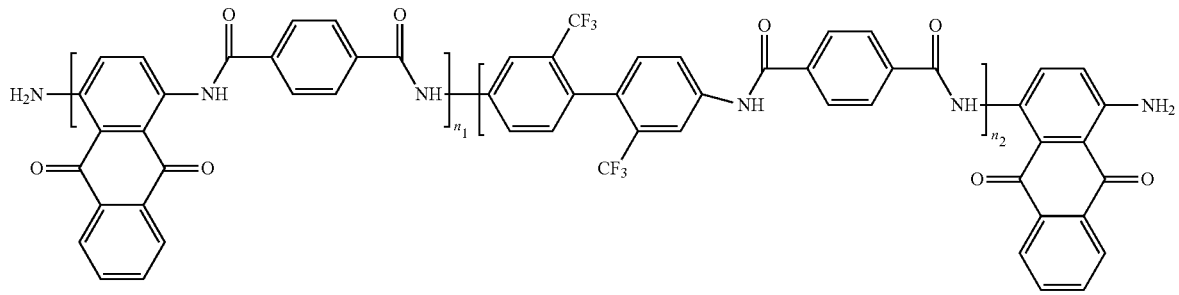

In Chemical Formula 13, n1 and n2 are the same or different, and are each independently a number greater than or equal to 0, provided that both n1 and n2 are not simultaneously 0.

Specifically, 600 g of N,N-dimethyl acetamide (DMAc) as a solvent is charged into a round-bottomed flask, and 0.99 mole equivalent (31.3 grams) of 2,2'-bis(trifluoromethyl)benzidine (TFDB), 0.08 mole equivalent (0.19 grams) of the DAAQ compound represented by Chemical Formula 4-1c, and 1.4 mole equivalent (10.8 grams) of pyridine are added and dissolved therein. After then, 50 milliliters (mL) of DMAC is further added to the flask to dissolve the remaining TFDB. Then, 0.7 mole equivalent (13.9 grams) of terephthaloyl chloride (TPCl) is divided into 4 portions, which are individually added, each portion at a time, to be mixed with the solution containing TFDB and DAAQ. The mixture is then vigorously stirred and reacted for 15 minutes at room temperature.

The resultant solution is further stirred under a nitrogen atmosphere for 2 hours, and then added to 7 liters of water containing 350 g of NaCl. The resulting mixture is stirred for 10 minutes. Subsequently, a solid produced therein is filtered, re-suspended twice by using 5 liters (L) of deionized water, and then re-filtered. The water remaining in the final product on the filter is removed to the extent possible by thoroughly pressing the filtered precipitate on a filter. The precipitate is then dried at 90° C. under vacuum for 48 hours, to obtain an oligomer-like diamine containing 70 mol % of amide structural unit, as a diamine monomer, as a final product. The prepared oligomer-like diamine has a number average molecular weight of about 1,400 grams per mole (gram/mole).

Synthesis Example 4: Preparation of an Oligomer-Like Diamine Containing 30 Mol % of an Amide Structural Unit Including CNAQ An oligomer-like diamine containing an amide structural unit that forms an aramid structure represented by Chemical Formula 11 is prepared by reacting TPCl (terephthaloyl chloride), CNAQ (1,4-diamino-2,3-dicyano-anthraquinone) represented by Chemical Formula 4-1a, and TFDB (2,2'-bis(trifluoromethyl)benzidine), with the same method as in Synthesis Example 1.

Chemical Formula 4-1a

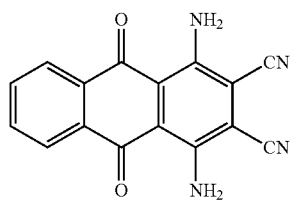

Chemical Formula 11

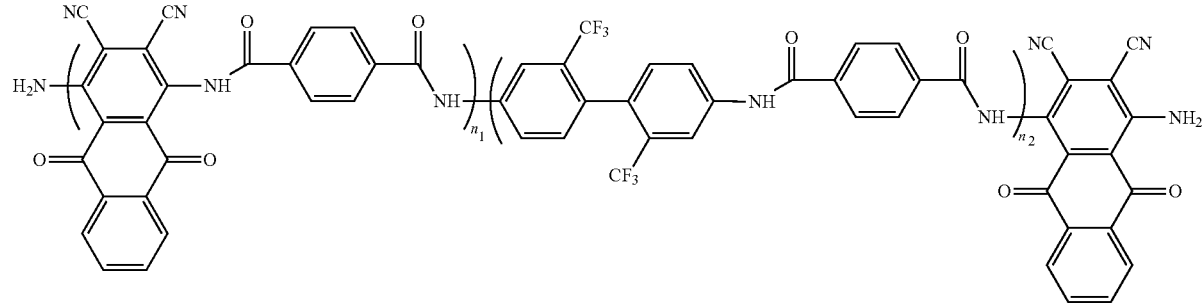

In Chemical Formula 11, n1 and n2 are the same or different, and are each independently a number greater than or equal to 0, provided that both n1 and n2 are not simultaneously 0.

Specifically, 600 g of N,N-dimethyl acetamide (DMAc) as a solvent is charged into a round-bottomed flask, and 0.99 mole equivalent (37.4 grams) of 2,2'-bis(trifluoromethyl)benzidine (TFDB), 0.27 mole equivalent (0.27 grams) of the CNAQ compound represented by Chemical Formula 4-1a, and 1.4 mole equivalent (5.6 grams) of pyridine are added and dissolved therein. After then, 50 milliliters (mL) of DMAC is further added to the flask to dissolve the remaining TFDB. Then, 0.3 mole equivalent (7.2 grams) of terephthaloyl chloride (TPCl) is divided into 4 portions, which are individually added, each portion at a time, to be mixed with the solution containing TFDB and CANQ. The mixture is then vigorously stirred and reacted for 15 minutes at room temperature.

The resultant solution is further stirred under a nitrogen atmosphere for 2 hours, and then added to 7 liters of water containing 350 g of NaCl. The resulting mixture is stirred for 10 minutes. Subsequently, a solid produced therein is filtered, re-suspended twice by using 5 liters (L) of deionized water, and then re-filtered. The water remaining in the final product on the filter is removed to the extent possible by thoroughly pressing the filtered precipitate on a filter. The precipitate is then dried at 90° C. under vacuum for 48 hours, to obtain an oligomer-like diamine containing 30 mol % of amide structural unit, as a diamine monomer, as a final product. The prepared oligomer-like diamine has a number average molecular weight of about 1,200 grams per mole (gram/mole).

Synthesis Example 5: Preparation of an Oligomer-Like Diamine Containing 70 Mol % of an Amide Structural Unit that does not Include Anthraquinone-Based Compound An amide structural unit-containing oligomer, as a diamine monomer, is prepared by reacting TPCl and 2,2'-bis(trifluoromethyl)benzidine (TFDB), in accordance with Reaction Scheme 2:

The resultant solution is further stirred under a nitrogen atmosphere for 2 hours, and then added to 7 liters of water containing 350 g of NaCl. The resulting mixture is stirred for 10 minutes. Subsequently, a solid produced therein is filtered, re-suspended twice by using 5 liters (L) of deionized water, and then re-filtered. The water remaining in the final product on the filter is removed to the extent possible by thoroughly pressing the filtered precipitate on a filter. The precipitate is then dried at 90° C. under vacuum for 48 hours, to obtain an amide structural unit-containing oligomer-like diamine represented in Reaction Scheme 2, as a final product. The prepared oligomer containing 70 mol % of amide structural unit has a number average molecular weight of about 1,400 grams per mole (gram/mole).

Examples and Comparative Example: Preparation of Poly(Amide-Imide) Copolymer Films Example 1: Preparation of a Poly(Amide-Imide) Copolymer Film Containing CNAQ 40 ppm 106 grams of N,N-dimethyl acetamide (DMAc) as a solvent is charged into a 4-neck double-walled 250 mL reactor, pre-heated to 25° C., and equipped with a mechanical stirrer and a nitrogen inlet. Then, 0.19 grams of the oligomer-like diamine prepared in Synthesis Example 1, and 10.9 g of 2,2'-bis(trifluoromethyl)benzidine (TFDB) are added thereto and dissolved, and the temperature is set to 25° C. Then, 4.5 grams of 3,3',4,4'-biphenyltetracarboxylic dianhydride (BPDA) and 8.3 grams of 4,4'-(hexafluoroisopropylidene)diphthalic anhydride (6FDA) are added thereto, and the mixture is stirred for 48 hours. Then, 4.1 grams of

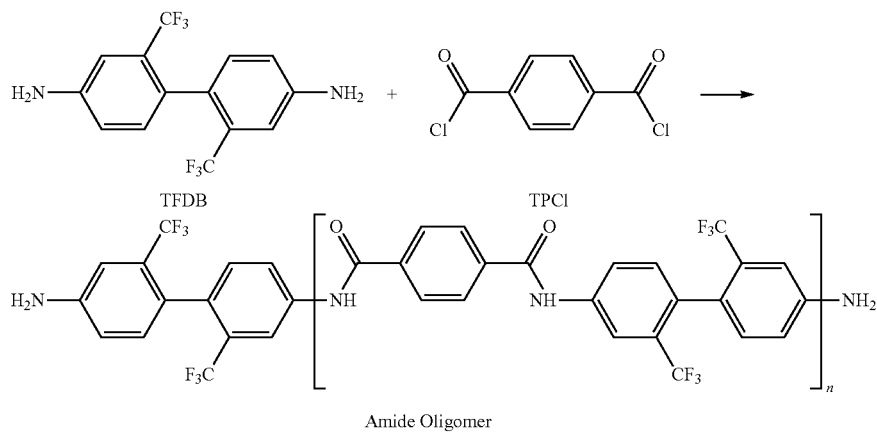

Reaction Scheme 2

Amide Oligomer

Specifically, 1 mole equivalent (31.3 grams) of 2,2'-bis(trifluoromethyl)benzidine (TFDB) and 1.4 mole equivalent (10.8 grams) of pyridine are dissolved in 600 g of N,N-dimethyl acetamide (DMAc) as a solvent in a round-bottomed flask, and 50 milliliters (mL) of DMAC is further added to the flask to dissolve the remaining TFDB. Then, 0.7 mole equivalent (13.9 g) of terephthaloyl chloride (TPCl) is divided into 4 portions, which are individually added, each portion at a time, to be mixed with the TFDB solution. The mixture is then vigorously stirred and reacted for 15 minutes at room temperature.

pyridine and 5.2 grams of acetic anhydride are added thereto, and the mixture is stirred for 24 hours to obtain a poly(amic acid-amide) copolymer solution, of which the solid content is 16 weight %.

After cooling the poly(amic acid-amide) solution to a temperature of 25° C., the solution is casted on a glass substrate, and dried for 40 minutes on a hot plate at a temperature of 100° C. Then, the resultant film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film.

Example 2: Preparation of a Poly(Amide-Imide) Copolymer Film Containing CNAQ 80 ppm A poly(amic acid-amide) copolymer solution of which the solid content is 16 weight % is prepared by reacting the oligomer-like diamine prepared in Synthesis Example 1, TFDB, BPDA, and 6FDA as in Example 1, provided that the content of CNAQ compound in the finally formed poly(imide-amide) copolymer is adjusted to 80 ppm based on the total weight of the poly(amic acid-amide) copolymer.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film.

Example 3: Preparation of a Poly(Amide-Imide) Copolymer Film Containing CNAQ 150 ppm A poly(amic acid-amide) copolymer solution of which the solid content is 16 weight % is prepared by reacting the oligomer-like diamine prepared in Synthesis Example 1, TFDB, BPDA, and 6FDA as in Example 1, provided that the content of CNAQ compound in the finally formed poly(imide-amide) copolymer is adjusted to 150 ppm based on the total weight of the poly(amic acid-amide) copolymer.

After cooling the poly(amic acid-amide) solution to a temperature of 25° C., the solution is casted on a glass substrate, and dried for 40 minutes on a hot plate at a temperature of 100° C. Then, the resultant film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film.

Example 4: Preparation of a Poly(Amide-Imide) Copolymer Film Containing CLAQ 40 ppm 106 grams of N,N-dimethyl acetamide (DMAc) as a solvent is charged into a 4-neck double-walled 250 mL reactor, pre-heated to 25° C., and equipped with a mechanical stirrer and a nitrogen inlet. Then, 0.19 grams of the oligomer-like diamine prepared in Synthesis Example 2, and 10.9 g of 2,2'-bis(trifluoromethyl)benzidine (TFDB) are added thereto and dissolved, and the temperature is set to 25° C. Then, 4.5 grams of 3,3',4,4'-biphenyltetracarboxylic dianhydride (BPDA) and 8.3 grams of 4,4'-(hexafluoroisopropylidene)diphthalic anhydride (6FDA) are added thereto, and the mixture is stirred for 48 hours. Then, 4.0 grams of pyridine and 5.2 grams of acetic anhydride are added thereto, and the mixture is stirred for 24 hours to obtain a poly(amic acid-amide) copolymer solution, of which the solid content is 16 weight %.

After cooling the poly(amic acid-amide) solution to a temperature of 25° C., the solution is casted on a glass substrate, and dried for 40 minutes on a hot plate at a temperature of 100° C. Then, the resultant film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film.

Example 5: Preparation of a Poly(Amide-Imide) Copolymer Film Containing DAAQ 40 ppm 106 grams of N,N-dimethyl acetamide (DMAc) as a solvent is charged into a 4-neck double-walled 250 mL reactor, pre-heated to 25° C., and equipped with a mechanical stirrer and a nitrogen inlet. Then, 0.24 grams of the oligomer-like diamine prepared in Synthesis Example 3, and 10.9 g of 2,2'-bis(trifluoromethyl)benzidine (TFDB) are added thereto and dissolved, and the temperature is set to 25° C. Then, 4.5 grams of 3,3',4,4'-biphenyltetracarboxylic dianhydride (BPDA) and 8.3 grams of 4,4'-(hexafluoroisopropylidene)diphthalic anhydride (6FDA) are added thereto, and the mixture is stirred for 48 hours. Then, 4.0 grams of pyridine and 5.2 grams of acetic anhydride are added thereto, and the mixture is stirred for 24 hours to obtain a poly(amic acid-amide) copolymer solution, of which the solid content is 16 weight %.

After cooling the poly(amic acid-amide) solution to a temperature of 25° C., the solution is casted on a glass substrate, and dried for 40 minutes on a hot plate at a temperature of 100° C. Then, the resultant film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film.

Example 6: Preparation of a Poly(Amide-Imide) Copolymer Film Containing CNAQ 20 ppm A poly(amic acid-amide) copolymer solution of which the solid content is 16 weight % is prepared by reacting the oligomer-like diamine prepared in Synthesis Example 1, TFDB, BPDA, and 6FDA as in Example 1, provided that the content of CNAQ compound in the finally formed poly(imide-amide) copolymer is adjusted to 20 ppm based on the total weight of the poly(amic acid-amide) copolymer.

After cooling the poly(amic acid-amide) solution to a temperature of 25° C., the solution is casted on a glass substrate, and dried for 40 minutes on a hot plate at a temperature of 100° C. Then, the resultant film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film.

Example 7: Preparation of a Poly(Amide-Imide) Copolymer Film Containing CNAQ 40 ppm 106 grams of N,N-dimethyl acetamide (DMAc) as a solvent is charged into a 4-neck double-walled 250 mL reactor, pre-heated to 25° C., and equipped with a mechanical stirrer and a nitrogen inlet. Then, 0.17 grams of the oligomer-like diamine prepared in Synthesis Example 4, and 10.9 g of 2,2'-bis(trifluoromethyl)benzidine (TFDB) are added thereto and dissolved, and the temperature is set to 25° C. Then, 4.5 grams of 3,3',4,4'-biphenyltetracarboxylic dianhydride (BPDA) and 8.4 grams of 4,4'-(hexafluoroisopropylidene)diphthalic anhydride (6FDA) are added thereto, and the mixture is stirred for 48 hours. Then, 4.0 grams of pyridine and 5.2 grams of acetic anhydride are added thereto, and the mixture is stirred for 24 hours to obtain a poly(amic acid-amide) copolymer solution, of which the solid content is 16 weight %.

After cooling the poly(amic acid-amide) solution to a temperature of 25° C., the solution is casted on a glass substrate, and dried for 40 minutes on a hot plate at a temperature of 100° C. Then, the resultant film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film.

Comparative Examples 1 and 2:
Poly(Amide-Imide) Copolymer Film that does not Include a Diamine Having a Maximum Absorption Wavelength in a Range from 500 nm to 700 nm in a Visible Light Region 106 grams of N,N-dimethyl acetamide (DMAc) as a solvent is charged into a 4-neck double-walled 250 mL reactor, pre-heated to 25° C., and equipped with a mechanical stirrer and a nitrogen inlet. Then, 11 grams of the oligomer-like diamine prepared in Synthesis Example 5 is added thereto and dissolved, and the temperature is set to 25° C. Then, 2.6 grams of 3,3',4,4'-biphenyltetracarboxylic dianhydride (BPDA) and 4.7 grams of 4,4'-(hexafluoroisopropylidene)diphthalic anhydride (6FDA) are added thereto, and the mixture is stirred for 48 hours. Then, 2.3 grams of pyridine and 3 grams of acetic anhydride are added thereto, and the mixture is stirred for 24 hours to obtain a poly(amic acid-amide) copolymer solution, of which the solid content is 16 weight %.

After cooling the poly(amic acid-amide) solution to a temperature of 25° C., the solution is casted on a glass substrate, and dried for 40 minutes on a hot plate at a temperature of 100° C. Then, the resultant film is separated from the glass substrate and introduced into a furnace, wherein the temperature is increased from the room temperature to 277° C., at a heating rate of 10° C. per minutes, maintained at 277° C. for about 25 minutes, and slowly cooled to room temperature to obtain a poly(amide-imide) copolymer film. In this case, an obtained poly(amide-imide) copolymer film having a thickness of 51 μm is referred to a film according to "Comparative Example 1", while another obtained poly(amide-imide) copolymer film having a thickness of 78 μm is referred to a film according to "Comparative Example 2". That is, the compositions of the two films according to Comparative Examples 1 and 2 are identical, and only the thicknesses are different to each other.

Comparative Example 3 Poly(Amide-Imide) Copolymer Film Including Back Coating

A poly(amide-imide) copolymer film is prepared as in Comparative Example 1 or 2, and a back coating including a siloxane-based resin and a blue dye is further formed on the surface thereof, wherein the back coating includes the blue dye in an amount of 30 ppm based on the total weight of the siloxane-based resin. Specifically, upon fabricating a poly(amide-imide) copolymer film as in Comparative Example 1 or Comparative Example 2, the thickness of the film is set to 81 μm. Then, a back coating composition including a blue dye in an amount of 30 ppm based on the total weight of the siloxane-based resin is coated on a surface of the film and cured to form a laminated film including a back coating and having a thickness of about 100 μm.

Comparative Example 4 Poly(Amide-Imide) Copolymer Film Including 30 ppm of Violet Pigment A poly(amic acid-amide) copolymer solution is prepared as in Comparative Example 1 or 2, dioxazine violet, a violet pigment, is added to the poly(amic acid-amide) copolymer solution in an amount of 30 ppm based on the total weight of the poly(amide-imide) copolymer, and the poly(amic acid-amide) copolymer solution containing dioxazine violet is heat-treated as in Comparative Example 1 to form a film according to Comparative Example 4.

Comparative Example 5: A Film Including 30 ppm of CNAQ that is not Copolymerized into, but is Mixed with Poly(Amide-Imide) Copolymer A poly(amic acid-amide) copolymer solution is prepared as in Comparative Example 1 or 2, the compound represented by Chemical Formula 4-1a (CNAQ) is added to the poly(amic acid-amide) copolymer solution in an amount of 30 ppm based on the total weight of the poly(amide-imide) copolymer, and the poly(amic acid-amide) copolymer solution containing CNAQ is heat-treated as in Comparative Example 1 to form a film according to Comparative Example 5.

Comparative Example 6: A Film Including 40 ppm of CNAQ that is not Copolymerized into, but is Mixed with Poly(Amide-Imide) Copolymer A poly(amic acid-amide) copolymer solution is prepared as in Comparative Example 1 or 2, the compound represented by Chemical Formula 4-1a (CNAQ) is added to the poly(amic acid-amide) copolymer solution in an amount of 40 ppm based on the total weight of the poly(amide-imide) copolymer, and the poly(amic acid-amide) copolymer solution containing CNAQ is heat-treated as in Comparative Example 1 to form a film according to Comparative Example 6.

Comparative Example 7: A Film Including 40 ppm of CLAQ that is not Copolymerized into, but is Mixed with Poly(Amide-Imide) Copolymer A poly(amic acid-amide) copolymer solution is prepared as in Comparative Example 1 or 2, the compound represented by Chemical Formula 4-1b (CLAQ) is added to the poly(amic acid-amide) copolymer solution in an amount of 40 ppm based on the total weight of the poly(amide-imide) copolymer, and the poly(amic acid-amide) copolymer solution containing CLAQ is heat-treated as in Comparative Example 1 to form a film according to Comparative Example 7.

Comparative Example 8: A Film Including 40 ppm of DAAQ that is not Copolymerized into, but is Mixed with Poly(Amide-Imide) Copolymer A poly(amic acid-amide) copolymer solution is prepared as in Comparative Example 1 or 2, the compound represented by Chemical Formula 4-1c (DAAQ) is added to the poly(amic acid-amide) copolymer solution in an amount of 40 ppm based on the total weight of the poly(amide-imide) copolymer, and the poly(amic acid-amide) copolymer solution containing DAAQ is heat-treated as in Comparative Example 1 to form a film according to Comparative Example 8.

Evaluation

The poly(amide-imide) copolymer films prepared in Examples 1 to 7 and Comparative Examples 1 to 8 are evaluated for the thickness, transmittance, Yellowness Index (YI), haze, and the values of L*, a*, and b* of the CIE color coordinate, and the obtained values are described in Table 1 below, along with the content of the amide structural unit in the poly(amide-imide) copolymer, as well as the additional compound added besides the basic monomers, TFDB, TPCl, 6FDA, and BPDA, for preparing the poly(amide-imide) copolymer and its content.

Specifically, a light transmittance (in the wavelength range of 350 nm to 750 nm), YI, haze, and the values of L*, a*, and b* of the CIE color coordinate are measured for a film having a thickness of about 50 micrometers, according to an E313 method by using a spectrophotometer, CM-3600d made by Konica Minolta Inc.

sented by Chemical Formulae 4-1a to 4-1c, besides the monomers of TFDB, TPCl, BPDA, and 6FDA. Specifically, all the films according to the Examples, except for Example 3 where an amount of the compound is 150 ppm, have greatly reduced YIs, such as, for examples, reduced by at least 0.5 and at most 2, compared with the films according to Comparative Example 1 or 2, while having slightly reduced transmittances, i.e., reduced within 1.5%. The reduction of YIs of the films according to the Examples may derive from the reductions of a* and b* values in the CIE color coordinate. That is, the films according to Examples 1 to 7 have a* values from about −1.4 to 0.32 and b* values from −1.35 to 0.81, while the a* values of Comparative Examples 1 and 2 are −0.18 and −0.47, respectively, and the b* values of Comparative Examples 1 and 2 are 1.33 and 1.93, respectively. Especially, the significant decrease in b* values of the films according to the Examples may result in the reduction of YI. As the b* value decreases to the "negative (−)" region in the CIE color coordinate, it appear blue, while as the b* value increases to the "positive (+)" region in the CIE color coordinate, it appears yellow.

Meanwhile, the film according to Comparative Example 3 is a laminated film in which the poly(amide-imide) copolymer film does not comprise any additional diamine or a dye, but the laminated film includes a back coating including

TABLE 1

|  | Added compound and amount (ppm) | Content of amide structural unit (mol %) | Thickness [μm] | Transmittance [%] | YI | Haze (%) | L* | a* | b* |
| --- | --- | --- | --- | --- | --- | --- | --- | --- | --- |
| Example 1 | CNAQ 40 | 70 | 45 | 88.1 | 0.67 | 0.24 | 95.26 | −0.6 | 0.38 |
| Example 2 | CNAQ 80 | 70 | 47 | 87.11 | −1.01 | 0.63 | 94.79 | −0.93 | −0.23 |
| Example 3 | CNAQ 150 | 70 | 49 | 85 | −3.59 | 0.49 | 93.88 | −1.37 | −1.35 |
| Example 4 | CLAQ 40 | 70 | 51 | 87.63 | 0.95 | 0.29 | 95.01 | 0.32 | 0.45 |
| Example 5 | DAAQ 40 | 70 | 50 | 88.1 | 1.87 | 0.26 | 95.2 | 0.32 | 0.28 |
| Example 6 | CNAQ 20 | 70 | 76 | 88.3 | 1 | 0.22 | 95.29 | −0.52 | 0.81 |
| Example 7 | CNAQ 40 | 30 | 50 | 89.5 | 1 | 0.2 | 94.1 | −0.5 | 0.7 |
| Comparative Example 1 | — | 70 | 51 | 88.46 | 2.56 | 0.77 | 95.36 | −0.18 | 1.33 |
| Comparative Example 2 | — | 70 | 78 | 88.2 | 3.4 | 0.8 | 95.24 | −0.47 | 1.93 |
| Comparative Example 3 | Blue dye 30 | 70 | 81 | 87.7 | 0.7 | — | 95.04 | −1.19 | 0.78 |
| Comparative Example 4 | Violet dye 30 | 70 | 81 | 86.4 | 2 | 0.24 | 94.48 | −0.76 | 1.29 |
| Comparative Example 5 | CNAQ 30 | 70 | 75 | 87.2 | 1.8 | 0.34 | 94.83 | −0.87 | 1.23 |
| Comparative Example 6 | CNAQ 40 | 70 | 49 | 87.49 | 1.08 | 0.47 | 94.95 | −0.54 | 0.71 |
| Comparative Example 7 | CLAQ 40 | 70 | 51 | 87.19 | 1.31 | 0.29 | 94.82 | 0.25 | 0.51 |
| Comparative Example 8 | DAAQ 40 | 70 | 50 | 86.85 | 1.90 | 0.26 | 94.68 | 0.5 | 0.56 |

As shown in Table 1, all the films according to Examples 1 to 7, which are prepared by including a diamine having a maximum absorption wavelength in a range from 500 nm to 700 nm in a visible light region, i.e., the compound represented by Chemical Formula 4-1a to 4-1c, have light transmittances of greater than or equal to 85%, YIs of about −4.0 to about 2, a* values of greater than or equal to about −2 to less than about 1, and b* values of greater than or equal to about −1.5 and less than about 1, in the CIE color coordinate, and thus, show improved optical properties, such as, for example, greatly decreased YI, while maintaining high transmittance. The improvement of optical properties of the films according to Examples 1 to 7 may be apparent when compared with those according to Comparative Examples 1 and 2, which do not include any of the compounds reprea blue dye in an amount of 30 ppm. A transmittance of the film is 87.7%, and YI is about 0.7, which shows improvement in optical properties, as YI is greatly reduced, compared with the film according to Comparative Example 2, which has a similar thickness. However, the laminated film according to Comparative Example 3 may be prepared by first preparing a poly(amide-imide) copolymer film, and then coating an additional back coating thereto, and thus, there may be many problems, such as, for example, an inconvenience in process, cost and time increase, production yield decrease, quality defect increases, and the like.

The film according to Comparative Example 4 is prepared by including dioxazine violet, a known violet pigment, in an amount or 30 ppm based on the weight of the poly(amide-imide) copolymer, but not including a diamine having a maximum absorption wavelength in a range from 500 nm to 700 nm in a visible light region, and has a transmittance of 86.4% and a YI of 2.

When comparing the film according to Comparative Example 4 with that according to Comparative Example 3, the amount of the blue dye included in the back coating of the film according to Comparative Example 3 and the violet pigment included in the film according to Comparative Example 4 are both 30 ppm, and the thickness of the film according to Comparative Examples 3 and 4 are identical to each other as 81 μm. In this case, YI of the film according to Comparative Example 3 is 2.0, while that of Comparative Example 4 is 1.8, and the transmittance of Comparative Example 3 is greater than that of Comparative Example 4. However, it is noted that the two films have similar optical properties to each other.

On the contrary, the film according to Example 6, in which the compound represented by Chemical Formula 4-1a (CNAQ) is polymerized with the other monomer to prepare a poly(amide-imide) copolymer in an amount of 20 ppm based on the total weight of the poly(amide-imide) copolymer has a higher transmittance of 88.3% than the film according to Comparative Example 3 or 4. The film according to Example 6 has a reduced YI of 1.0, and has b* value of 0.81 in the CIE color coordinate, which is greater than that of Comparative Example 3, but less than that of Comparative Example 3, which shows great improvement in optical properties, such as, for example, YI, of the film according to Example 6 compared with that according to Comparative Example 4. That is, a poly(amide-imide) copolymer prepared by polymerizing the diamine having a maximum absorption wavelength in a range from 500 nm to 700 nm in a visible light region with the other monomers for preparing the poly(amide-amide) copolymer has greatly increased transmittance and lowered YI, and thus has great improvement in optical properties, compared with those prepared by including identical or similar amount of a dye, and the like, which is not copolymerized into, but merely mixed with the poly(amide-imide) copolymer.

Figure 2:
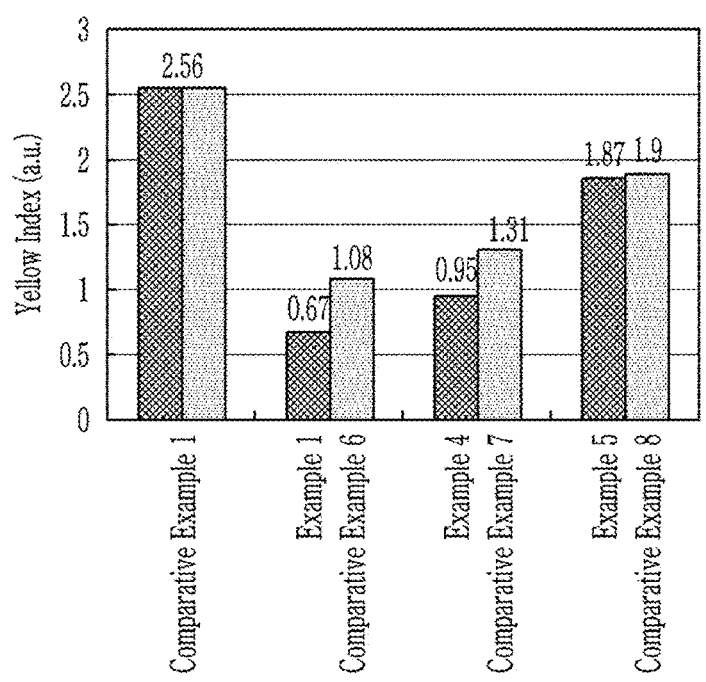
FIG. 2 is a diagram showing Yellowness Indexes (YIs) of the films prepared by using a compound selected from CNAQ (Example 1 and Comparative Example 6), CLAQ (Example 4 and Comparative Example 7), and DAAQ (Example 5 and Comparative Example 8), either by copolymerizing the compound with the other monomers for forming a poly(amide-imide) copolymer (Examples 1, 4, and 5) or by merely mixing the compound with a pre-prepared poly(amide-imide) copolymer (in Comparative Examples 6 to 8), compared with a YI of the film prepared not by using any of the compound, but by using only the other monomers for preparing the poly(amide-imide) copolymer (Comparative Example 1).

Meanwhile, FIG. 1 and FIG. 2 show transmittances and YIs, respectively, of Comparative Example 1, Example 1 versus Comparative Example 6, Example 4 versus Comparative Example 7, and Example 5 versus Comparative Example 8, where in Examples 1, 4, and 5, the compound represented by Chemical Formula 4-1a (CNAQ), the compound represented by Chemical Formula 4-1b (CLAQ), and the compound represented by Chemical Formula 4-1c (DAAQ), respectively, are included and copolymerized with the other monomers to prepare the poly(amide-imide) copolymers, while in Comparative Examples 6 to 8, the compounds are merely mixed with the pre-prepared poly(amide-imide) copolymers in the same amount (40 ppm) as the in these Examples.

As shown from FIG. 1, the films according to Examples 1, 4, and 5, prepared by including and copolymerizing the compound represented by Chemical Formula 4-1a (CANQ), the compound represented by Chemical Formula 4-1b (CLAQ), and the compound represented by Chemical Formula 4-1c (DAAQ), respectively, with the other monomers, have transmittances slightly decreased within 1%, compared to that of Comparative Example 1, which does not the compound, while the films according to Comparative Examples 6, 7, and 8, prepared by merely mixing the compound represented by Chemical Formula 4-1a (CANQ), the compound represented by Chemical Formula 4-1b (CLAQ), and the compound represented by Chemical Formula 4-1c (DAAQ), respectively, with the pre-prepared poly(amide-imide) copolymers, have further decreased, i.e., by 0.97% to 1.61%, transmittances compared to that of Comparative Example 1. That is, the films according to an embodiment prepared by including and copolymerizing the compounds with the other monomers have less decreased in transmittances than those prepared by merely mixing the compounds.

Further, as shown from FIG. 2, the films according to Examples 1, 4, and 5, prepared by including and copolymerizing the compound represented by Chemical Formula 4-1a (CANQ), the compound represented by Chemical Formula 4-1b (CLAQ), and the compound represented by Chemical Formula 4-1c (DAAQ), respectively, with the other monomers, have greatly decreased YI, i.e., by as much as at least 0.69 and up to 1.89, compared to that of Comparative Example 1, which does not comprise the compound, while the films according to Comparative Examples 6, 7, and 8, prepared by merely mixing the compound represented by Chemical Formula 4-1a (CANQ), the compound represented by Chemical Formula 4-1b (CLAQ), and the compound represented by Chemical Formula 4-1c (DAAQ), respectively, with the pre-prepared poly(amide-imide) copolymers, have decreased YIs, by as much as up to 1.48, compared to that of Comparative Example 1, which shows that the effect of decreasing YI is more effective in the films according to the Examples than those according to the Comparative Examples.

Consequently, a film prepared by including and copolymerizing a diamine having a maximum absorption wavelength in a range from 500 nm to 700 nm in a visible light region as a monomer with the other monomer for preparing a poly(amide-imide) copolymer according to an embodiment may have improved optical properties due to greatly reduced YI, while minimizing reduction of transmittance. Further, as the diamine having a maximum absorption wavelength in a range from 500 nm to 700 nm in a visible light region may be included in a very small amount, such as, for example, less than or equal to 200 ppm, for example, less than or equal to 150 ppm, for example, less than or equal to 100 ppm, for example, less than or equal to 70 ppm, for example, less than or equal to 60 ppm, and the like, based on the weight of the poly(amide-imide) copolymer, the diamine may not substantially affect the amounts of the other monomers for preparing a poly(amide-imide) copolymer, and thus, excellent mechanical properties of a poly(amide-imide) copolymer may be maintained. That is, a poly(amide-imide) copolymer prepared by including and copolymerizing a substituted or unsubstituted aromatic diamine having a maximum absorption wavelength in a range from 500 nm to 700 nm in a visible light region as a monomer with the other monomer for preparing a poly(amide-imide) copolymer and an article including the poly(amide-imide) copolymer according to an embodiment may have greatly improved optical properties, as well as maintaining excellent mechanical properties, and thus have an effect of improvement of both properties in a trade-off relationship.

Meanwhile, there is no problem of releasing the substituted or unsubstituted aromatic diamine having a maximum absorption wavelength in a range from 500 nm to 700 nm in a visible light region from the films according to Examples 1 to 7 as time goes on. However, the dye or compounds merely mixed with a pre-prepared poly(amide-imide) copolymer in the films according to Comparative Examples 4 to 8 may be released from films, and thus, an improvement effect in optical properties of the films may not be maintained as time goes on.

As described above, a poly(amide-imide) copolymer prepared by including and copolymerizing a substituted or unsubstituted aromatic diamine having a maximum absorption wavelength in a range from 500 nm to 700 nm in a visible light region as a monomer with the other monomer for preparing a poly(amide-imide) copolymer and an article including the poly(amide-imide) copolymer according to an embodiment may be easily prepared and have greatly improved optical properties, as well as maintaining excellent mechanical properties, and thus, the article may be advantageous for a use in a display device, such as, for example, a high hardness window film for a flexible display device.

While this disclosure has been described in connection with what is presently considered to be practical exemplary embodiments, it is to be understood that the present disclosure is not limited to the embodiments presented herein, but, on the contrary, is intended to cover various modifications and equivalent arrangements included within the spirit and scope of the appended claims.

What is claimed is:

1. A poly(amide-imide) copolymer that is a reaction product of a substituted or unsubstituted aromatic diamine having a maximum absorption wavelength in a range from 500 nanometers to 700 nanometers in a visible light region, and is represented by Chemical Formula 4, a diamine represented by Chemical Formula 1, a dicarbonyl compound represented by Chemical Formula 2, and a tetracarboxylic acid dianhydride represented by Chemical Formula 3:

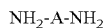

Chemical Formula 1 wherein in Chemical Formula 1,

A is a ring system including two or more C6 to C30 aromatic rings linked by a single bond, wherein each of the two or more aromatic rings is independently unsubstituted or substituted by an electron-withdrawing group;

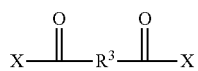

Chemical Formula 2 wherein, in Chemical Formula 2, $R^3$ is a substituted or unsubstituted phenylene or a substituted or unsubstituted biphenylene group, and each X is an identical or a different halogen atom,

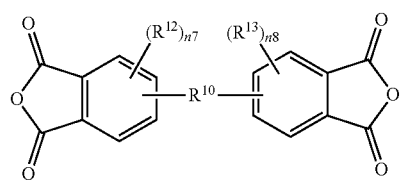

Chemical Formula 3 wherein, in Chemical Formula 3, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, n7 and n8 are each independently an integer ranging from 0 to 3, and

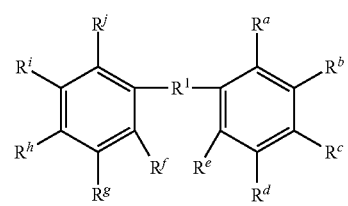

Chemical Formula 4 wherein, in Chemical Formula 4, $R^1$ is represented by —C(=O)— or -(L$^1$)-N=N-(L$^2$)-, wherein L$^1$ and L$^2$ are each independently a single bond, a C1 to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof, and $R^a$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein R$^{210}$, and R$^{211}$, and R$^{212}$ are each independently hydrogen, or a C1 to C10 aliphatic organic group, or optionally, R$^e$ and R$^f$ are linked to each other to form —C(=O), provided that two of R$^a$ to R$^e$, or two of R$^f$ to R$^j$ are amino groups.

2. The poly(amide-imide) copolymer according to claim 1, wherein the substituted or unsubstituted aromatic diamine having a maximum absorption wavelength in a visible light region comprises a maximum absorption wavelength in a range from 550 nanometers to 650 nanometers.

3. The poly(amide-imide) copolymer according to claim 1, wherein if $R^1$ is represented by —C(=O)— in the aromatic diamine represented by Chemical Formula 4 then R$^e$ and R$^f$ are linked to each other to form —C(=O)—, and

R$^a$ to R$^d$ and R$^g$ to R$^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, provided that two of R$^a$ to R$^d$, or two of R$^g$ to R$^j$ are amino groups; or if R$^1$ is represented by -(L$^1$)-N=N-(L$^2$)- in the aromatic diamine represented by Chemical Formula 4, then L$^1$ and L$^2$ are each independently single bond, a C1 to C20 alkylene group, a C2 to C20 alkenylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof.

4. The poly(amide-imide) copolymer according to claim 3, wherein the aromatic diamine represented by Chemical Formula 4 is represented by at least one of Chemical Formula 4-1 or Chemical Formula 4-2:

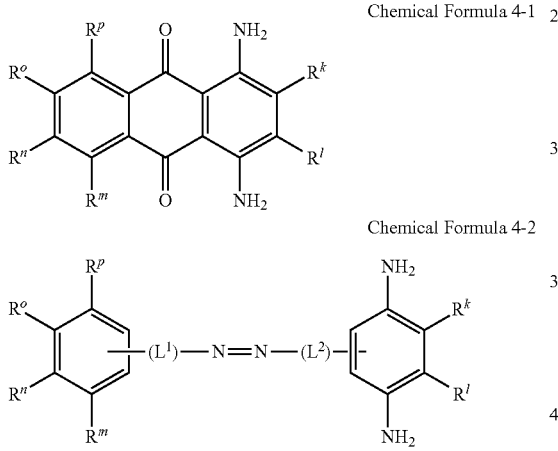

Chemical Formula 4-1

Chemical Formula 4-2 wherein, in Chemical Formulae 4-1 and 4-2,

R$^k$ to R$^p$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —OR$^{201}$, wherein, R$^{201}$ is a C1 to C10 aliphatic organic group, or —SiR$^{210}$R$^{211}$R$^{212}$, wherein, R$^{210}$, R$^{211}$, and R$^{212}$ are each independently hydrogen, or a C1 to C10 aliphatic organic group, and wherein in Chemical Formula 4-2, L$^1$ and L$^2$ are each independently single bond, a C1 to C20 alkylene group, a C2 to C20 alkenylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof.

5. The poly(amide-imide) copolymer according to claim 4, wherein in Chemical Formulae 4-1 and 4-2, R$^k$ and R$^l$ are each independently hydrogen, deuterium, a halogen, hydroxyl group, cyano group, a substituted or unsubstituted C1 to C20 alkyl group, or a substituted or unsubstituted C6 to C20 aryl group, and all of R$^m$ to R$^p$ are hydrogen atoms.

6. The poly(amide-imide) copolymer according to claim 1, wherein the diamine represented by Chemical Formula 4 comprises a diamine represented by Chemical Formula 4-1:

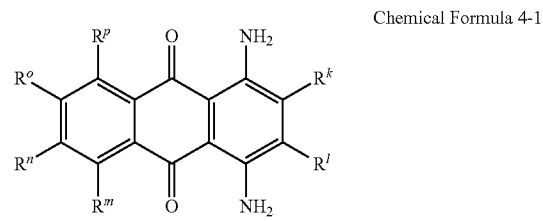

Chemical Formula 4-1 wherein, in Chemical Formula 4-1,

R$^k$ and R$^l$ are each independently hydrogen, deuterium, a halogen, cyano group, a substituted or unsubstituted C1 to C20 alkyl group, or a substituted or unsubstituted C6 to C20 aryl group, and all of R$^m$ to R$^p$ are hydrogen atoms.

7. The poly(amide-imide) copolymer according to claim 1, wherein the diamine represented by Chemical Formula 1 comprises a ring system that includes two C6 to C12 aromatic rings linked by a single bond, wherein each of the two C6 to C12 aromatic rings is substituted by an electron-withdrawing group selected from a halogen atom, a nitro group, a cyano group, a C1 or C2 haloalkyl group, a C2 to C6 alkanoyl group, or a C1 to C6 ester group.

8. The poly(amide-imide) copolymer according to claim 1, wherein the diamine represented by Chemical Formula 1 comprises at least one diamine represented by chemical formulae:

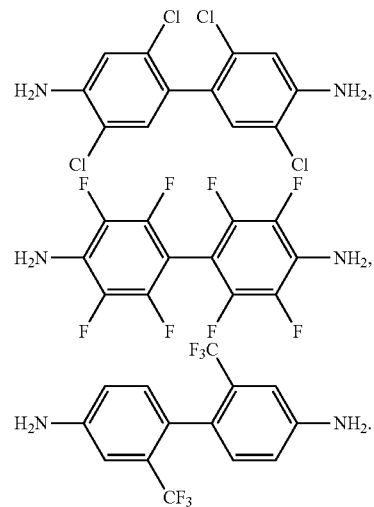

9. The poly(amide-imide) copolymer according to claim 1, wherein the diamine represented by Chemical Formula 1 comprises a diamine represented by Chemical Formula A:

Chemical Formula A

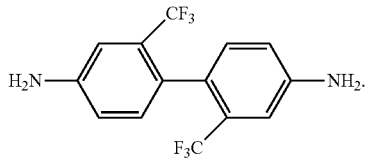

10. The poly(amide-imide) copolymer according to claim 1, wherein in Chemical Formula 2, $R^3$ is a phenylene group, and each X is independently Cl or Br.

11. The poly(amide-imide) copolymer according to claim 1, wherein the tetracarboxylic acid dianhydride represented by Chemical Formula 3 comprises at least one selected from 3,3',4,4'-biphenyl tetracarboxylic dianhydride, 3,3',4,4'-diphenylsulfone tetracarboxylic dianhydride, 4,4'-(hexafluoroisopropylidene)diphthalic anhydride, and 4,4'-oxydiphthalic anhydride.

12. The poly(amide-imide) copolymer according to claim 1, wherein the tetracarboxylic acid dianhydride represented by Chemical Formula 3 comprises a combination of 3,3',4,4'-biphenyl tetracarboxylic dianhydride and 4,4'-(hexafluoroisopropylidene)diphthalic anhydride.

13. The poly(amide-imide) copolymer according to claim 1, wherein an amount of the aromatic diamine represented by Chemical Formula 4 is less than or equal to 200 parts per million based on the total weight of the poly(amide-imide) copolymer.

14. A composition for preparing a poly(amide-imide) copolymer comprising a diamine represented by Chemical Formula 5, and a tetracarboxylic acid dianhydride represented by Chemical Formula 3:

alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —$OR^{201}$, wherein, $R^{201}$ is a C1 to C10 aliphatic organic group, or —$SiR^{210}R^{211}R^{212}$, wherein, $R^{210}$, $R^{211}$, and $R^{212}$ are each independently hydrogen, or a C1 to C10 aliphatic organic group; and when $R^1$ is represented by -$(L^1)$-N=N-$(L^2)$-, $R^b$, $R^c$, and $R^e$ to $R^j$ are each independently hydrogen, deuterium, a halogen, hydroxyl group, cyano group, an amino group, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C7 to C20 arylalkyl group, a substituted or unsubstituted C6 to C20 aryl group, a (meth)acryl group, a(meth)acrylate group, an epoxy group, a glycidoxypropyl group, a —$OR^{201}$, wherein, $R^{201}$ is a C1 to C10 aliphatic organic group, or —$SiR^{210}R^{211}R^{212}$, wherein, $R^{210}$, $R^{211}$, and $R^{212}$ are each independently hydrogen, or a C1 to C10 aliphatic organic group;

$R^3$ is a substituted or unsubstituted phenylene or a substituted or unsubstituted biphenylene group, A is a ring system including two or more C6 to C30 aromatic rings linked by a single bond, wherein each of the two or more aromatic rings is independently unsubstituted or substituted by an electron-withdrawing group;

n1 and n2 are the same or different, and each independently a number greater than or equal to 0, provided that both n1 and n2 are not simultaneously 0;

Chemical Formula 5

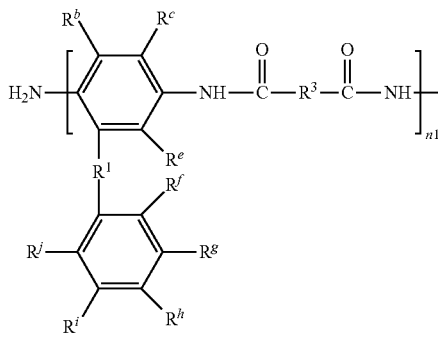

wherein, in Chemical Formula 5, $R^1$ is represented by —C(=O)— or -$(L^1)$-N=N-$(L^2)$-, wherein $L^1$ and $L^2$ are each independently single bond, a C1 to C20 alkylene group, a C2 to C20 alkenylene group, a C3 to C20 cycloalkylene group, a C6 to C20 arylene group, —O—, —S—, —C(=O)—, —C(=O)O—, —CH(OH)—, —C(=O)NH—, —S(=O)$_2$—, —Si(CH$_3$)$_2$—, —(CF$_2$)$_q$—, wherein, 1≤q≤10, —C(CH$_3$)$_2$—, —C(CF$_3$)$_2$—, or a combination thereof, and when $R^1$ is represented by —C(=O)—, $R^e$ and $R^f$ are linked to each other to form —C(=O)—, and $R^b$, $R^c$, and $R^g$ to $R^j$ are each independently hydrogen, deuterium, a halogen, hydroxyl group, cyano group, an amino group, a substituted or unsubstituted C1 to C20 alkyl group, a substituted or unsubstituted C2 to C20

Chemical Formula 3

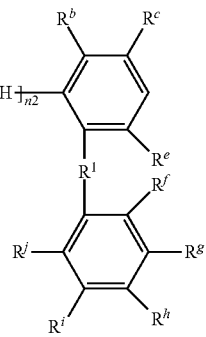

wherein, in Chemical Formula 3, $R^{10}$ is a single bond, —O—, —S—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, R$^{12}$ and R$^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, and n7 and n8 are each independently an integer ranging from 0 to 3.

15. The composition for preparing a poly(amide-imide) copolymer according to claim 14, wherein the composition further comprises a diamine represented by Chemical Formula 5-1:

Chemical Formula 5-1

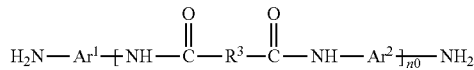

wherein in Chemical Formula 5-1,

R$^3$ is a substituted or unsubstituted phenylene or a substituted or unsubstituted biphenylene group, Ar$^1$ and Ar$^2$ are each independently a ring system including two or more C6 to C30 aromatic rings linked by a single bond, wherein each of the two or more aromatic rings is independently unsubstituted or substituted by an electron-withdrawing group, and n0 is a number greater than or equal to 0.

16. The composition for preparing a poly(amide-imide) copolymer according to claim 14, wherein R$^1$ of Chemical Formula 5 is —C(=O)—, R$^b$, R$^c$, and R$^g$ to R$^j$ are each independently hydrogen, deuterium, a halogen, hydroxyl group, cyano group, a substituted or unsubstituted C1 to C20 alkyl group, or a substituted or unsubstituted C6 to C20 aryl group, A is a ring system including two phenylene groups linked by a single bond, wherein each of the two phenylene groups is independently substituted by an electron-withdrawing group selected from a halogen atom, nitro group, cyano group, a C1 to C2 haloalkyl group, a C2 to C6 alkanoyl group, and a C1 to C6 ester group.

17. The composition for preparing a poly(amide-imide) copolymer according to claim 14, wherein the tetracarboxylic acid dianhydride represented by Chemical Formula 3 comprises a combination of the compound represented by Chemical Formula 3-1, and the compound represented by Chemical Formula 3-2:

Chemical Formula 3-1

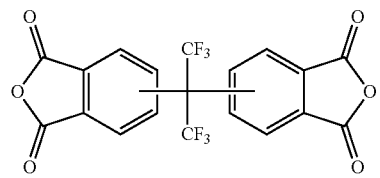

Chemical Formula 3-2

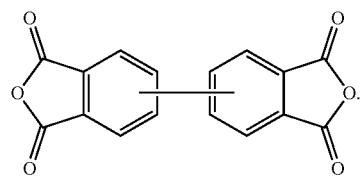

18. An article comprising a poly(amide-imide) copolymer according to claim 1.

19. The article according to claim 18, wherein the article comprises a film, wherein the film has a* of −3.0 to 3.0 and b* of −3.0 to 3.0 at the color coordinate.

20. The article according to claim 18, wherein the article comprises a film, wherein the film has a transmittance of greater than or equal to 85%, and a Yellowness Index of −4.0 to 3.0.

21. A display device comprising the article according to claim 18.

* * * * *